(12) United States Patent
Lizotte

(10) Patent No.: US 12,448,811 B2
(45) Date of Patent: Oct. 21, 2025

(54) HANDLE SYSTEM FOR VERTICAL DRAWER, CABINET STRUCTURE PROVIDED WITH SUCH SYSTEM, KIT FOR ASSEMBLING THE SAME, AND CORRESPONDING METHODS OF MANUFACTURING, ASSEMBLING AND OPERATING ASSOCIATED THERETO

(71) Applicant: ROUSSEAU METAL INC., St-Jean-Port-Joli (CA)

(72) Inventor: Gerry Lizotte, La Pocatière (CA)

(73) Assignee: ROUSSEAU METAL INC., St-Jean-Port-Joli (CA)

( * ) Notice: Subject to any disclaimer, the term of this patent is extended or adjusted under 35 U.S.C. 154(b) by 265 days.

(21) Appl. No.: 18/551,177

(22) PCT Filed: Mar. 19, 2021

(86) PCT No.: PCT/CA2021/050369
§ 371 (c)(1),
(2) Date: Sep. 18, 2023

(87) PCT Pub. No.: WO2022/192980
PCT Pub. Date: Sep. 22, 2022

(65) Prior Publication Data
US 2024/0175290 A1 May 30, 2024

(51) Int. Cl.
*A47B 88/42* (2017.01)
*E05B 1/00* (2006.01)
*E05B 65/46* (2017.01)

(52) U.S. Cl.
CPC ............ *E05B 1/0046* (2013.01); *A47B 88/42* (2017.01)

(58) Field of Classification Search
CPC ... A47B 88/42; A47B 2095/024; E05B 65/44; E05B 65/46; E05B 1/0046
(Continued)

(56) References Cited

U.S. PATENT DOCUMENTS

| D144,157 S | 3/1946 | Dahl |
|---|---|---|
| 5,163,568 A | 11/1992 | Laurendeau |

(Continued)

FOREIGN PATENT DOCUMENTS

| CA | 2245001 A1 | 10/1998 |
|---|---|---|
| CA | 2259720 A1 | 4/1999 |

(Continued)

OTHER PUBLICATIONS

International Preliminary Report on Patentability received for PCT Serial No. PCT/CA2021/050369 on Sep. 28, 2023, 6 pgs.
(Continued)

*Primary Examiner* — James O Hansen
(74) *Attorney, Agent, or Firm* — Merchant & Gould P.C.

(57) ABSTRACT

A handle system is for use in combination with a vertical drawer of a cabinet structure. The handle system includes a blocking assembly operatively provided about a bottom portion of the drawer, and an activation rod configured for operatively cooperating with the blocking assembly, in order to selectively operate a blocking component thereof between blocking and releasing configurations. The handle system also includes a handle assembly operatively mountable about an outer side of the vertical drawer. The handle assembly includes a gripping handle, the gripping handle being provided with an outer activation button and a corresponding internal transmission mechanism operatively linked to a top end of the activation rod for selectively urging the activation rod between lowered and raised configurations, and in turn operating the blocking assembly between the blocked and releasing configurations respectively, via a corresponding pressing action of the activation button.

103 Claims, 15 Drawing Sheets

(58) Field of Classification Search
USPC .................................. 312/215, 222, 332.1
See application file for complete search history.

(56) References Cited

U.S. PATENT DOCUMENTS

| | | | |
|---|---|---|---|
| 6,048,001 A | 4/2000 | Miller | |
| 6,098,821 A | 8/2000 | Dube | |
| D430,786 S | 9/2000 | Hickman | |
| 6,227,756 B1 | 5/2001 | Dube | |
| 6,762,934 B2 * | 7/2004 | Kitchen | H04L 63/083 312/223.1 |
| 6,851,286 B2 | 2/2005 | Dube | |
| 6,920,986 B2 | 7/2005 | Lacombe | |
| D520,341 S | 5/2006 | Eenigenburg | |
| D523,667 S | 6/2006 | Bisson | |
| 7,140,700 B2 | 11/2006 | Dube | |
| 7,172,258 B2 | 2/2007 | Bisson | |
| 7,588,162 B2 | 9/2009 | Dube | |
| D690,972 S | 10/2013 | Lizotte | |
| D778,707 S | 2/2017 | Tonelli | |
| D779,302 S | 2/2017 | Lizotte | |
| 10,422,171 B2 | 9/2019 | Lizotte | |
| D862,027 S | 10/2019 | Lizotte | |
| D863,852 S | 10/2019 | Lizotte | |
| D866,181 S | 11/2019 | Flamand | |
| 10,669,754 B2 | 6/2020 | Lizotte | |
| D931,707 S | 9/2021 | Qiao | |
| D951,754 S | 5/2022 | Xiang | |
| D972,912 S | 12/2022 | Lizotte | |
| 2003/0164665 A1 | 9/2003 | Guay | |
| 2004/0007885 A1 | 1/2004 | Michael | |
| 2006/0103140 A1 | 5/2006 | Bella | |
| 2006/0138788 A1 | 6/2006 | Winardi | |
| 2008/0141742 A1 | 6/2008 | Stuckey | |
| 2008/0209815 A1 | 9/2008 | Chiu | |
| 2010/0199727 A1 | 8/2010 | Varney | |
| 2014/0084764 A1 * | 3/2014 | Doglio | H05K 7/1489 403/322.4 |
| 2014/0318198 A1 | 10/2014 | Gokcebay | |
| 2019/0069431 A1 | 2/2019 | Kho | |
| 2019/0106907 A1 * | 4/2019 | Pavlik | E05B 61/00 |

FOREIGN PATENT DOCUMENTS

| | | |
|---|---|---|
| CA | 2371546 A1 | 8/2003 |
| CA | 2387483 A1 | 11/2003 |
| CA | 2413204 A1 | 11/2003 |
| CA | 2389563 A1 | 12/2003 |
| CA | 2396345 A1 | 1/2004 |
| CA | 105706 S | 4/2005 |
| CA | 2451946 A1 | 6/2005 |
| CA | 2461840 A1 | 9/2005 |
| CA | 2481893 A1 | 4/2006 |
| CA | 2523317 A1 | 4/2006 |
| CA | 142502 S | 6/2012 |
| CA | 2865344 A1 | 3/2016 |
| CA | 2865345 A1 | 3/2016 |
| CA | 2962453 A1 | 3/2016 |
| CA | 2962469 A1 | 3/2016 |
| CA | 166461 S | 11/2016 |
| CA | 175735 S | 3/2018 |
| CA | 176419 S | 4/2018 |
| CA | 177763 S | 7/2018 |
| CA | 196275 S | 4/2021 |
| JP | 2007130377 A | 5/2007 |

OTHER PUBLICATIONS

International Search Report and Written Opinion received for PCT Serial No. PCT/CA2021/050369 on Nov. 29, 2021, 7 pgs.
European Search Report received for EP Application No. 21930631.3 on Nov. 14, 2024, 7 pgs.

* cited by examiner

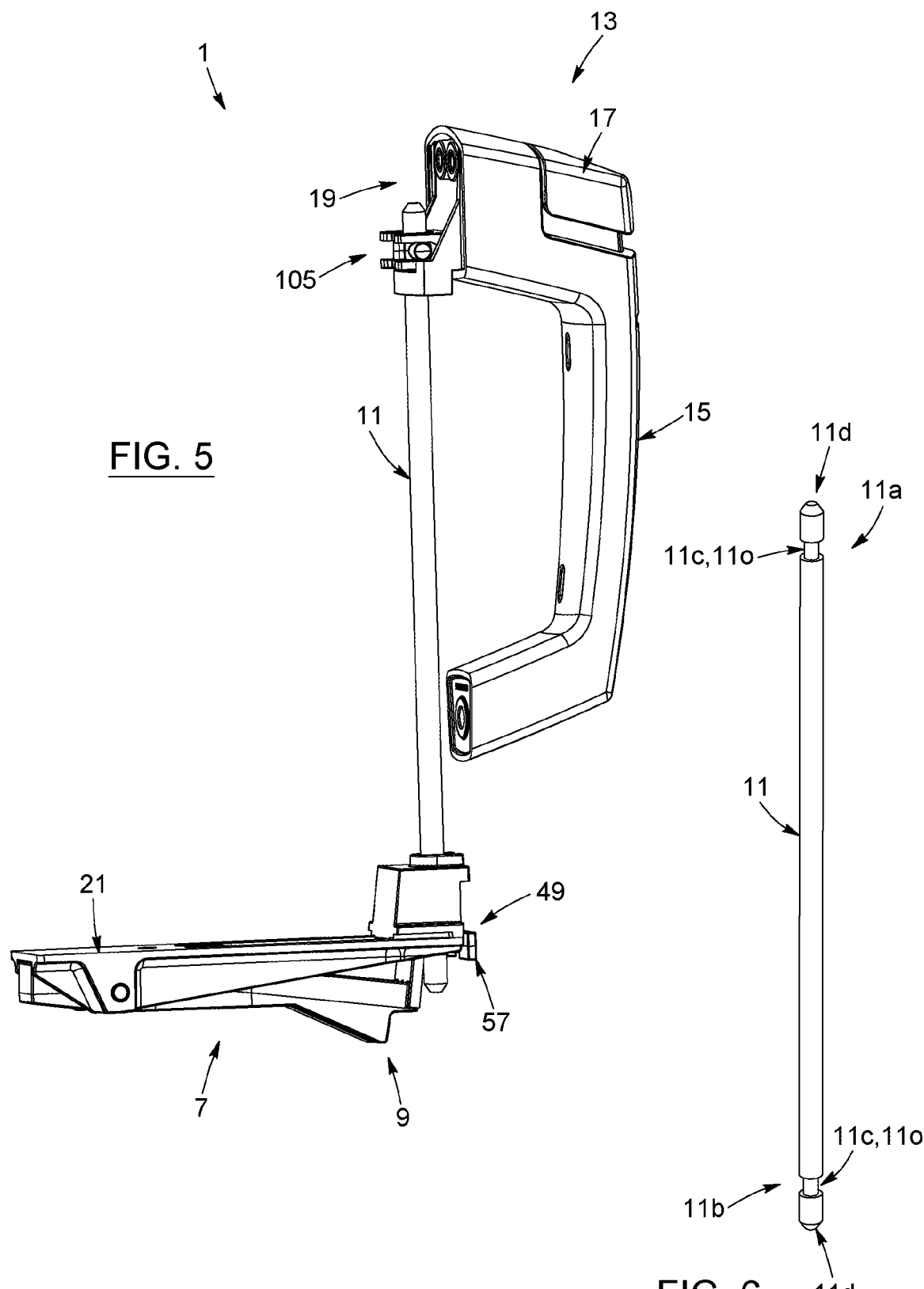

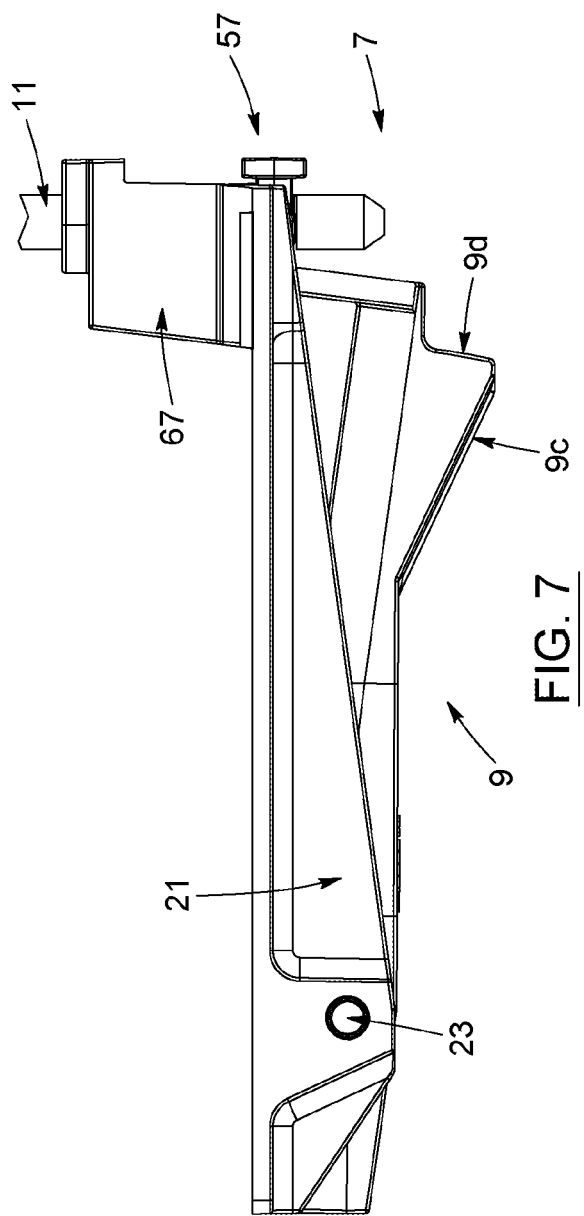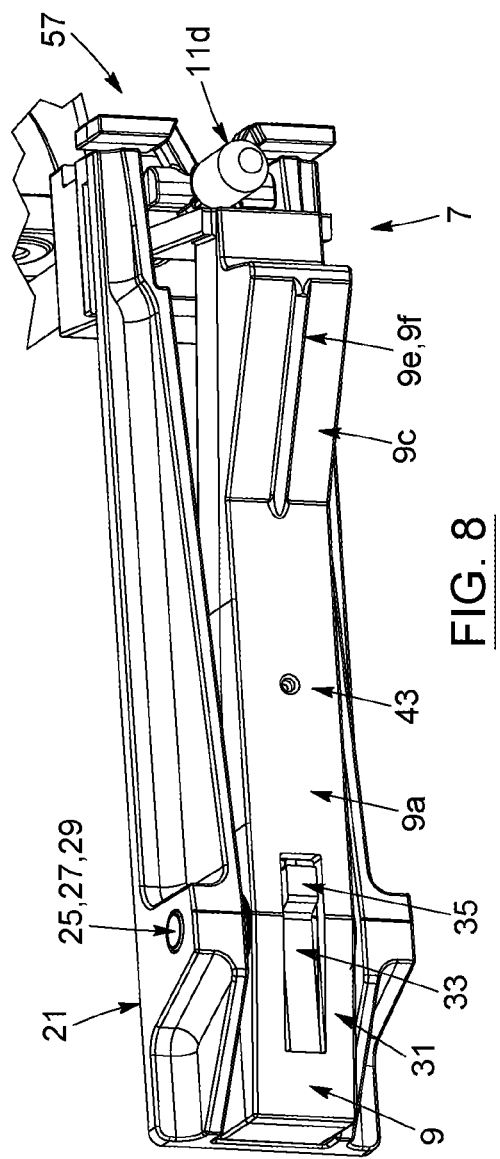

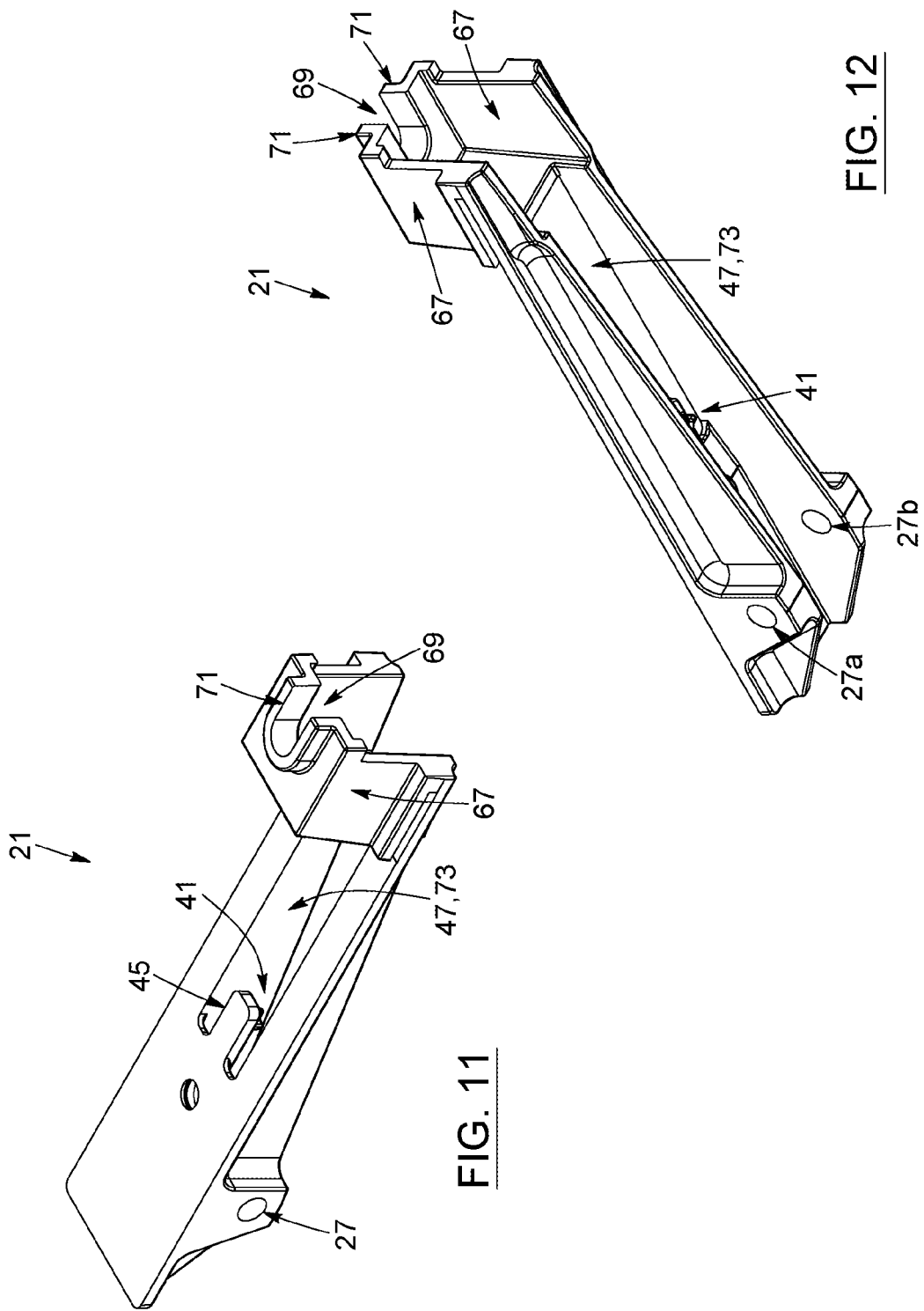

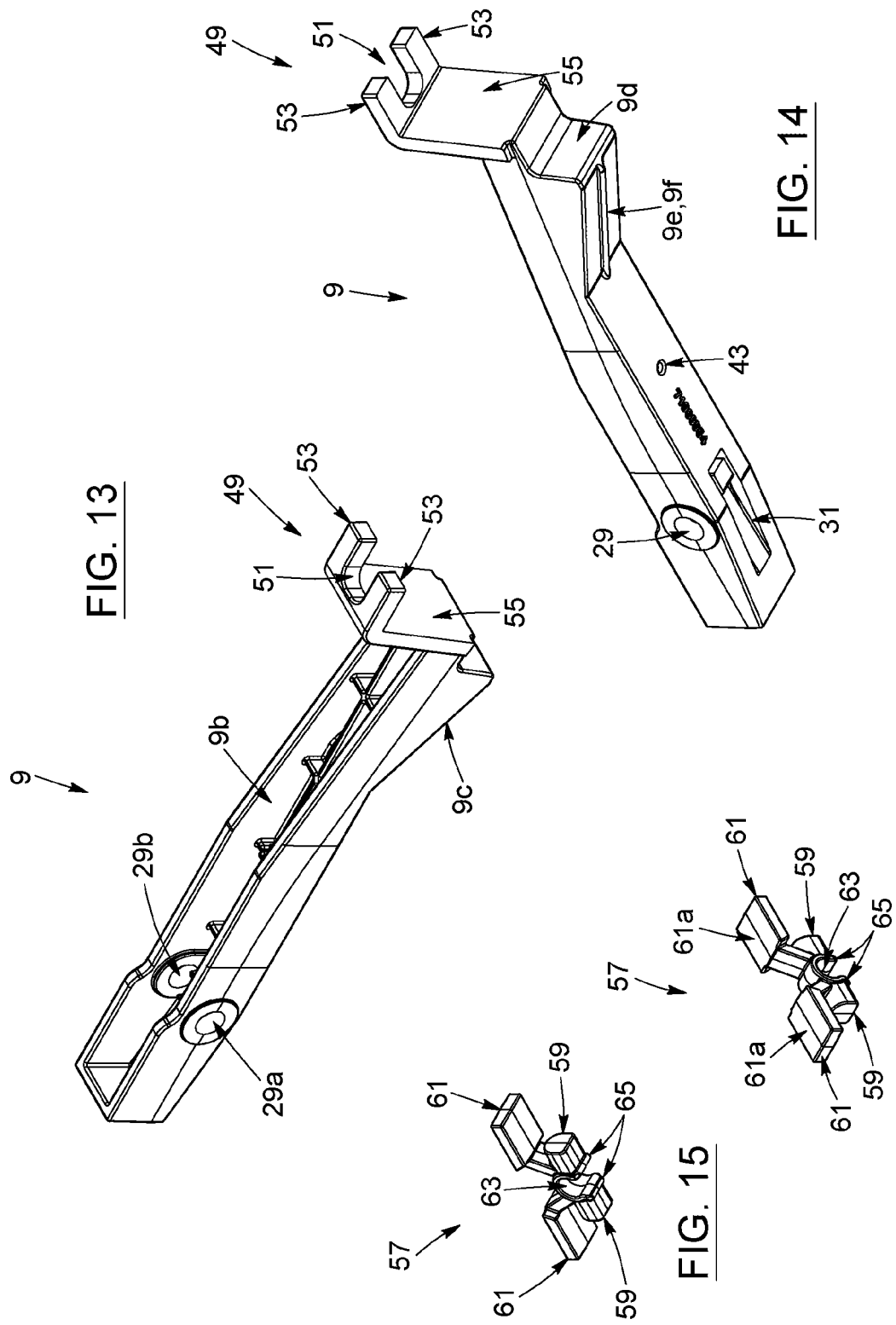

HANDLE SYSTEM FOR VERTICAL DRAWER, CABINET STRUCTURE PROVIDED WITH SUCH SYSTEM, KIT FOR ASSEMBLING THE SAME, AND CORRESPONDING METHODS OF MANUFACTURING, ASSEMBLING AND OPERATING ASSOCIATED THERETO

CROSS-REFERENCE TO THE RELATED APPLICATION

The present application is a National Stage Filing of PCT International Application No. PCT/CA2021/050369 filed on Mar. 19, 2021. The application is incorporated herein by reference in its entirety.

FIELD OF THE INVENTION

The present invention relates to the field of drawers, cabinets and/or the like. More particularly, the present invention relates to a handle system for a vertical drawer, and also relates to a cabinet structure provided with such a system, as well as to a kit with corresponding components for assembling the same (whether it be the handle system itself and/or a resulting cabinet structure), and to corresponding methods of manufacturing, assembling and/or operating associated thereto.

BACKGROUND

The Assignee of the present patent application has developed over the years various systems and products to be used with drawers, cabinets and/or the like, some of which are described and/or illustrated in the following US utility and design patents having been granted: US 2003/0164665; U.S. Pat. Nos. 5,163,568; 6,098,821; 6,227,756; 6,851,286; 6,920,986; 7,140,700; 7,172,258; 7,588,162; 10,422,171; 10,669,754; D523,667; D690,972; D779,302; D862,027; D863,852 and D866,181; as well in US published patent application No. US 2003/0164665, the content(s) of which is(are) incorporated herein by reference.

Yet other products developed over the years by the Assignee of the present case are also described and/or illustrated in the following Canadian patents and patent applications: U.S. Pat. Nos. 2,245,001; 2,259,720; 2,371,546; 2,387,483; 2,389,563; 2,396,345; 2,413,204; 2,451,946; 2,461,840; 2,481,893; 2,523,317; 2,865,344; 2,865,345; 2,962,453; and 2,962,469; as well as in the following Canadian industrial designs having been obtained: 105706; 142502; 166461; 175735; 176419; 177763; and 196275; the content(s) of which is(are) incorporated herein by reference.

Despite these improvements over the years, there is always a need to continue innovating and finding better and/or different ways of using and locking drawers, such as vertical drawers, for example, and to be able do so, in a quicker, easier, simpler, faster, more efficient, more convenient, more reliable, more secure, more versatile, more sustainable and/or more desirable manner.

For example, for most conventional vertical drawers that are typically configured to be pulled in-and-out of a corresponding cabinet structure, a corresponding component (ex. a handle) and/or an associated separate key must be used, and must be manually "turned" in rotation (ex. half-a-turn, full turn, or may be even more), in order to be able to "unlock" the vertical drawer and be able to open it by pulling the vertical drawer out from the cabinet structure, but also, that very same corresponding component (ex. a handle) and/or associated separate key must be used again, for "locking" and "maintaining the vertical drawer" in place when pulled back into the cabinet structure, which is very undesirable for obvious reasons (ex. it's long, tedious, time-consuming and impossible to do if the key is not available, etc.). In cases where the vertical drawer cannot be easily pulled back into the cabinet structure, and locked/maintained in place, and in circumstances where the cabinet structure may be subject to considerable movement (ex. in ships, service trucks, etc.—when travelling), the vertical drawer may move disadvantageously back-and-forth outside of the cabinet structure, thereby undesirably exposing the content of the drawer, as well as exposing the content of the drawer to potential fall of, as well as possibly exposing the cabinet structure to repeated banging from the oscillating drawer, and potential damages to said cabinet structure and/or drawer, which is obviously undesirable, for many obvious reasons.

Therefore, it would be particularly useful to be able to provide an improved system which would be able to overcome or at the very least minimize some of known drawbacks associated with the conventional ways and devices used for vertical drawers, for example.

SUMMARY OF THE INVENTION

An object of the present invention is to provide a handle system which, by virtue of its design and components, would be an improvement over other related conventional systems, devices and/or methods known in the prior art.

In accordance with the present invention, the above object is achieved, as will be easily understood from the present description, with a handle system (also referred to herein simply as "product" and/or "system") such as the one briefly described herein and such as the one exemplified in the accompanying drawing(s).

More particularly, according to one aspect of the present invention, an object is to provide a handle system for use in combination with a vertical drawer configured for being pulled in and out of a corresponding cabinet structure, the handle system comprising:

a blocking assembly operatively mountable onto a bottom portion of the vertical drawer, and being operable between a first configuration known as a blocking configuration where a blocking component of the blocking assembly abuts against an internal portion of the cabinet structure thus preventing the vertical drawer from being pulled out from the cabinet structure, and a second configuration known as a releasing configuration where the blocking component is drawn away from said internal portion of the cabinet structure thus allowing the vertical drawer to be pulled out from the cabinet structure;

an activation rod being positioned, shaped and sized so as to be mountable about an inner side of the vertical drawer, the activation rod having opposite top and bottom ends, the bottom end of the activation rod being positioned, shaped and sized so as to operatively cooperate with the blocking assembly in order to selectively operate the blocking component between the blocking and releasing configurations; and a handle assembly being positioned, shaped and sized so as to be operatively mountable about an outer side of the vertical drawer, the handle assembly including a gripping handle, the gripping handle being provided with an outer activation button and a corresponding internal transmission mechanism being operatively linked to the top end of the activation rod for selectively urging said activation rod between lowered and raised configurations, and in turn operating the blocking assembly between the blocked and releasing configurations respectively, via a corresponding pressing action of the activation button.

According to yet another aspect of the invention, there is also provided a cabinet structure comprising at least one vertical drawer being provided with the above-mentioned handle system.

According to yet another aspect of the invention, there is also provided a method of manufacturing components of the above-mentioned handle system and/or cabinet structure.

According to yet another aspect of the invention, there is also provided a method of assembling components of the above-mentioned handle system and/or cabinet structure.

According to yet another aspect of the invention, there is also provided a method of using the above-mentioned handle system, cabinet structure and/or component(s) thereof.

According to yet another aspect of the invention, there is also provided a kit with components for assembling the above-mentioned handle system and/or cabinet structure.

According to yet another aspect of the present invention, there is also provided a set of components for interchanging with components of the above-mentioned kit.

According to yet another aspect of the present invention, there is also provided a method of assembling components of the above-mentioned kit and/or set.

According to yet another aspect of the present invention, there is also provided a method of opening and/or closing a vertical drawer with the above-mentioned handle system, component(s) thereof, kit, set and/or method(s).

According to yet another aspect of the present invention, there is also provided a method of doing business with the above-mentioned handle system, cabinet structure, component(s) thereof, kit, set and/or method(s).

The objects, advantages, and other features of the present invention will become more apparent upon reading of the following non-restrictive description of preferred embodiments thereof, given for the purpose of exemplification only, with reference to the accompanying drawings.

BRIEF DESCRIPTION OF THE DRAWINGS

FIG. 5 is a perspective view of the handle system of the vertical drawer shown in FIG. 4, to better illustrate the activation rod and the associated handle and blocking assemblies according to a possible embodiment of the present invention.

FIG. 6 is a perspective view of the activation rod shown in FIG. 5.

FIG. 7 is a side view of a portion of what is shown in FIG. 5, to better illustrate the blocking assembly and associated components/portions thereof cooperating with a bottom end of the activation rod according to a possible embodiment of the present invention.

FIG. 8 is a bottom perspective view of what is shown in FIG. 7.

FIG. 11 is a top perspective view of the mounting component being shown in FIG. 10.

FIG. 12 is a bottom perspective view of what is shown in FIG. 11.

FIG. 13 is a top perspective view of the blocking component being shown in FIG. 10.

FIG. 14 is a bottom perspective view of what is shown in FIG. 13.

FIG. 15 is a perspective view of the attachment component being shown in FIG. 10.

FIG. 16 is another perspective view of what is shown in FIG. 15.

DETAILED DESCRIPTION OF THE INVENTION

Figure 1:
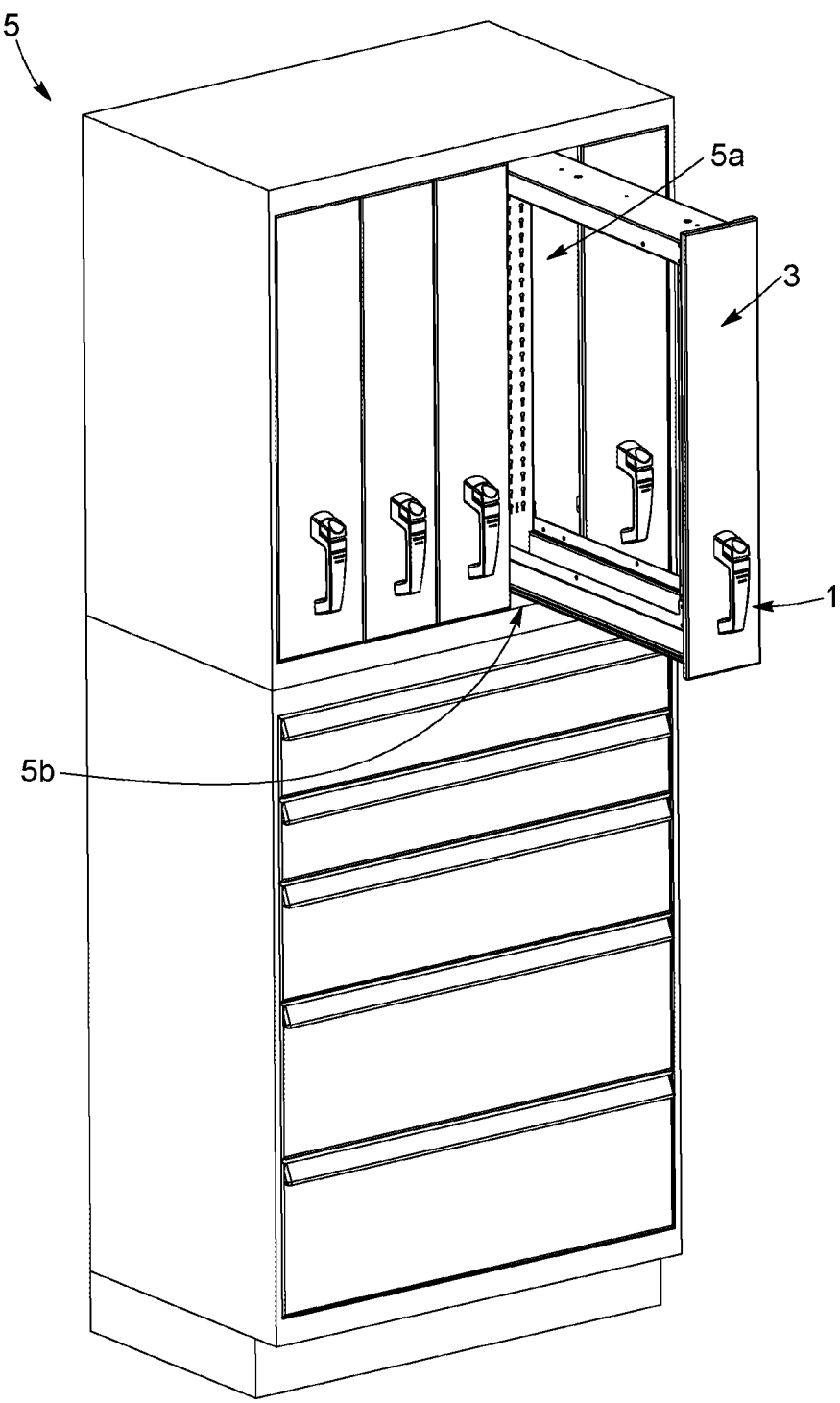
FIG. 1 is a perspective view of a cabinet structure provided with at least one vertical drawer and handle system according to a possible embodiment of the present invention, this particular embodiment being shown including five vertical drawers, with one of them in an opened configuration, and the cabinet structure being also shown with five horizontal drawers.
Figure 2:
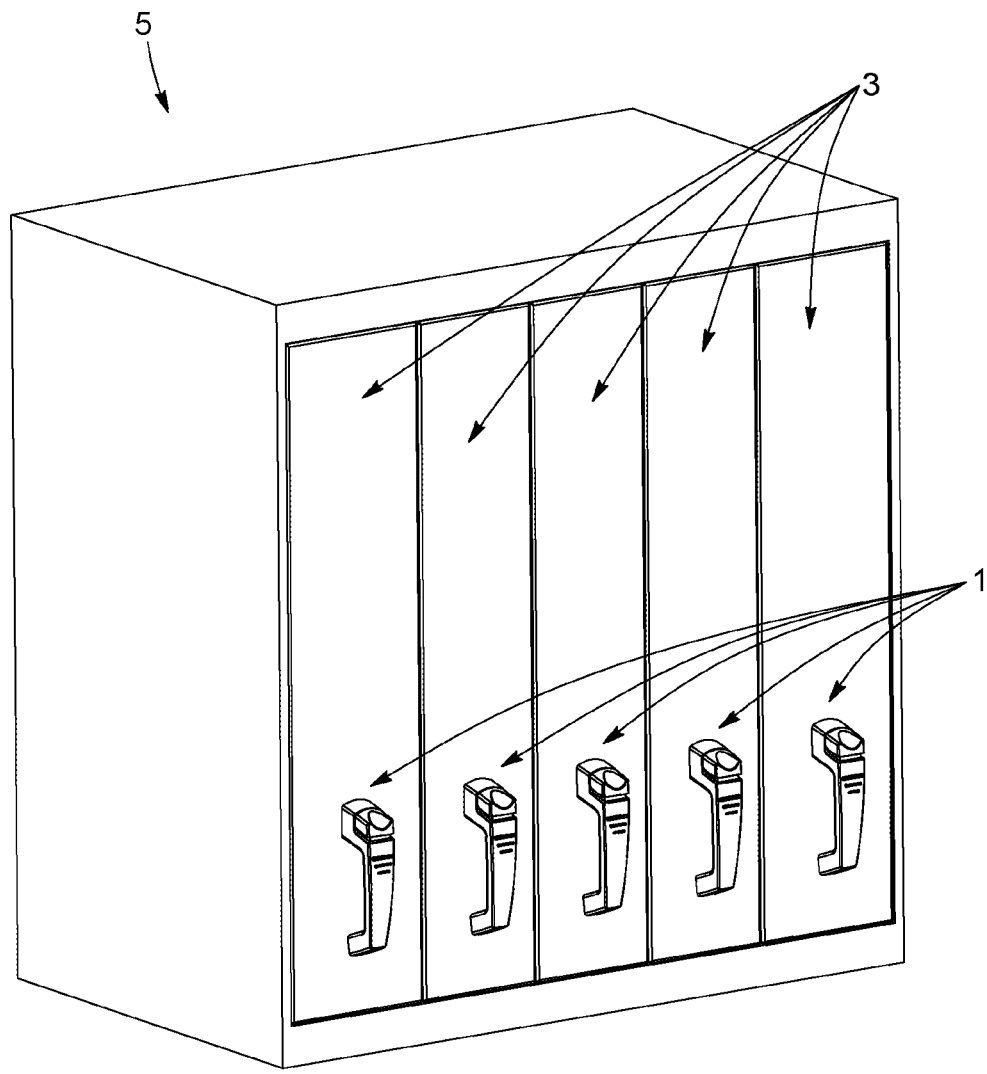
FIG. 2 is a perspective view along the top portion of the cabinet structure shown in FIG. 1, the vertical drawers and associated handle systems being shown in a closed configuration according to a possible embodiment of the present invention.
Figure 3:
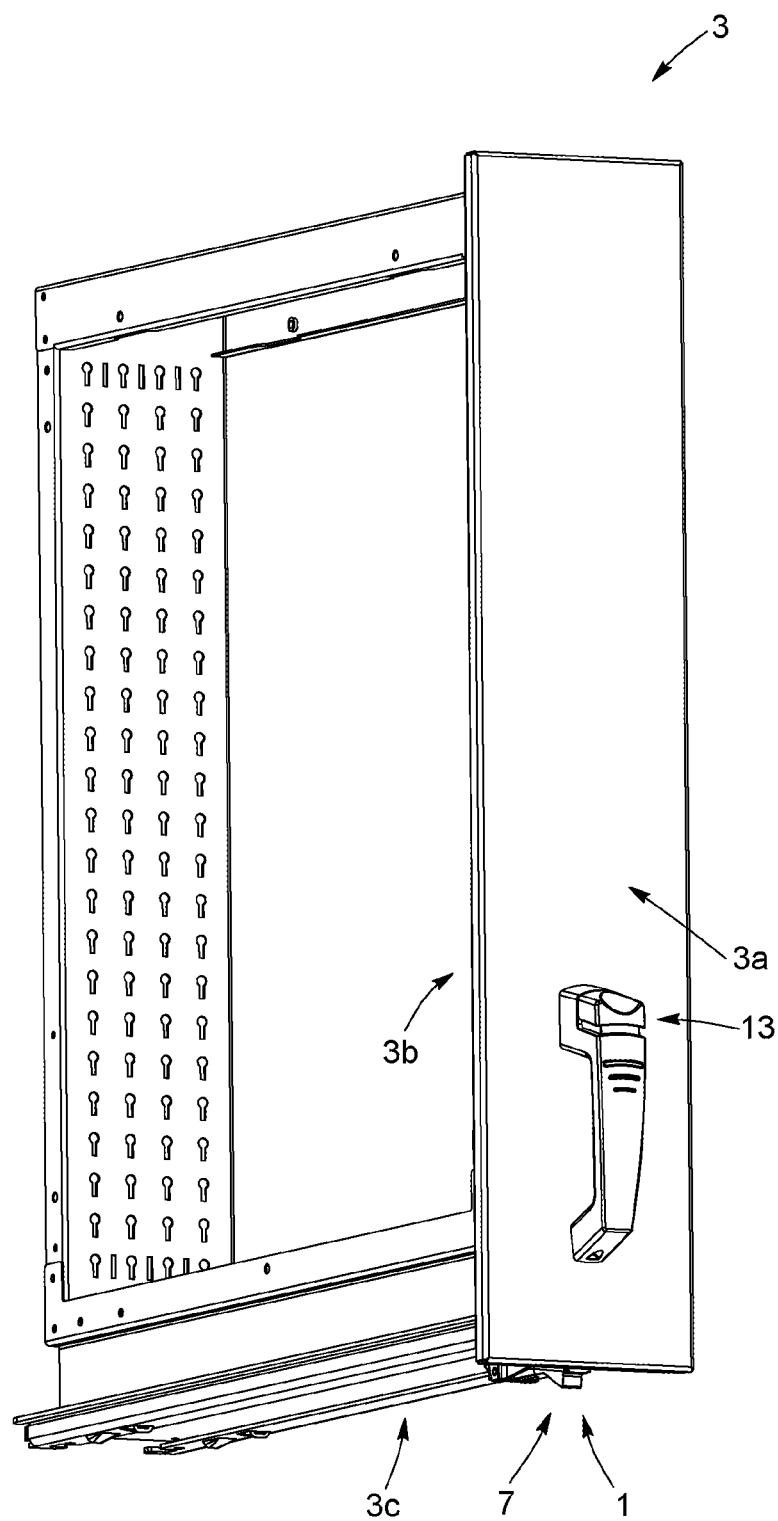
FIG. 3 is a perspective view in isolation of the vertical drawer and associated handle system being shown in an opened configuration in FIG. 1.
Figure 4:
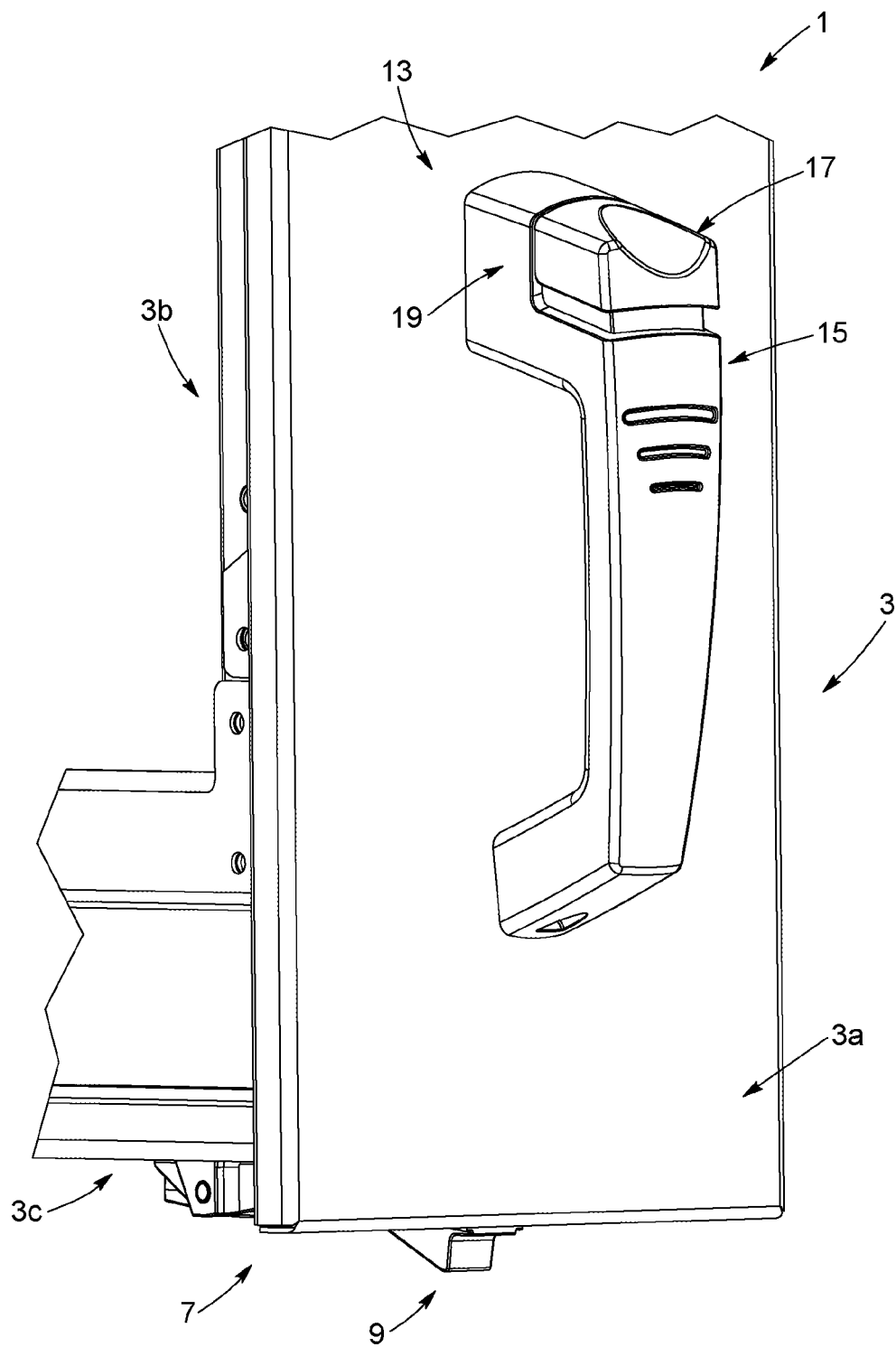
FIG. 4 is an enlarged view of a portion of what is shown in FIG. 3, so as to better illustrate the handle system and associated handle and blocking assemblies according to a possible embodiment of the present invention.
Figure 9:
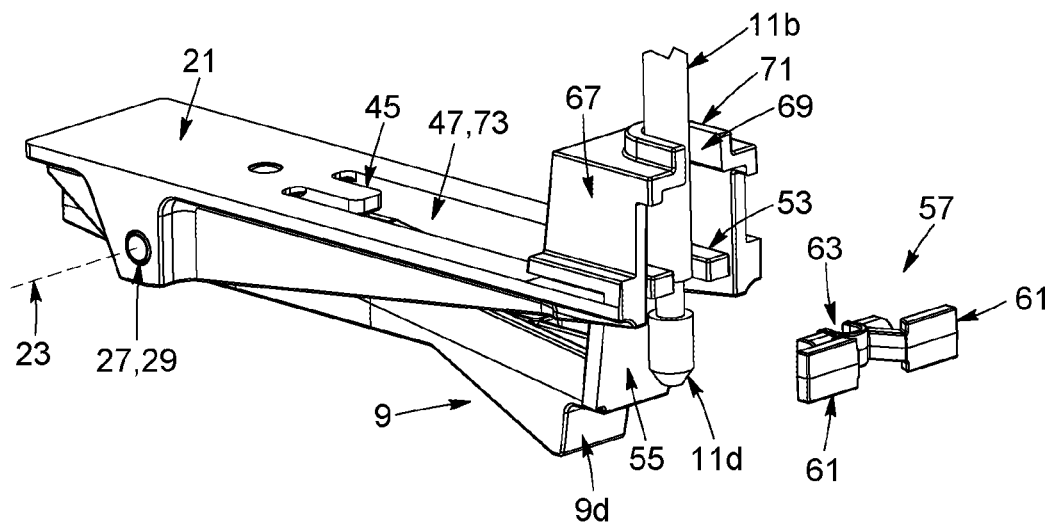
FIG. 9 is a perspective view of what is shown in FIG. 7, the attachment component being shown removed in an exploded relationship with respect to the activation rod so as to better illustrate other aspects of the blocking assembly and of the activation rod.
Figure 10:
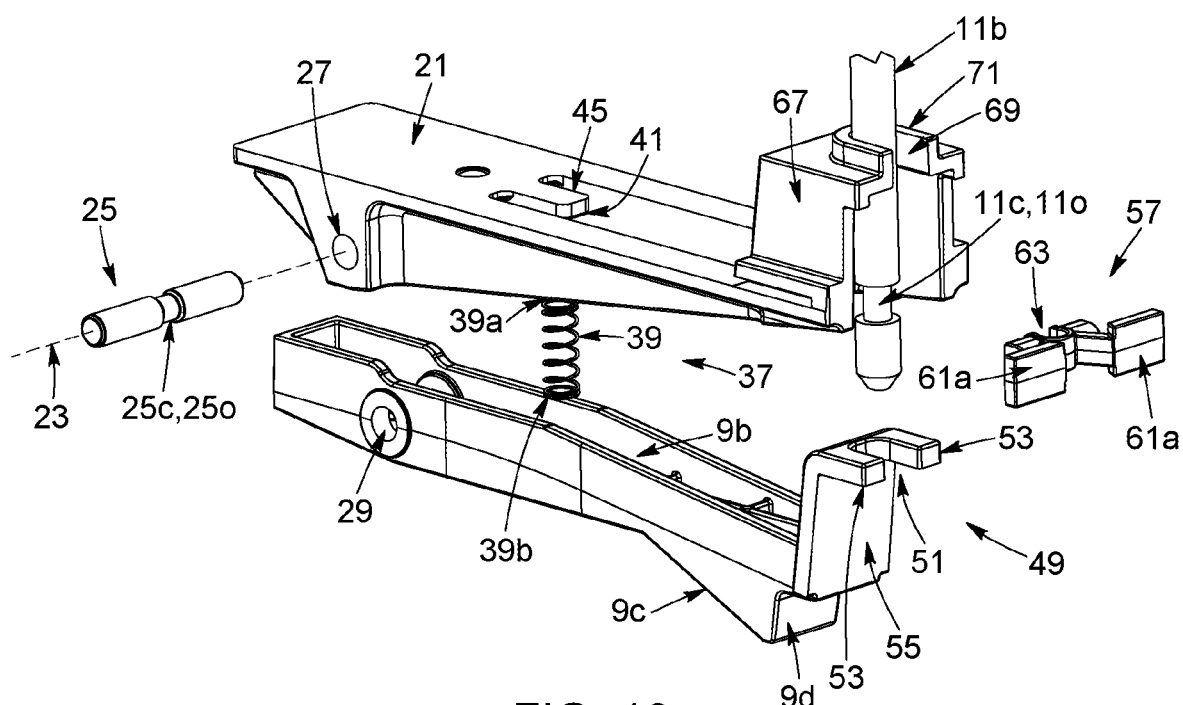
FIG. 10 is another perspective view of what is shown in FIG. 8, some of the components being now shown in an exploded relationship so as to better illustrate a possible pivot pin and biased spring to be used for the blocking assembly according to a possible embodiment of the present invention.
Figure 17:
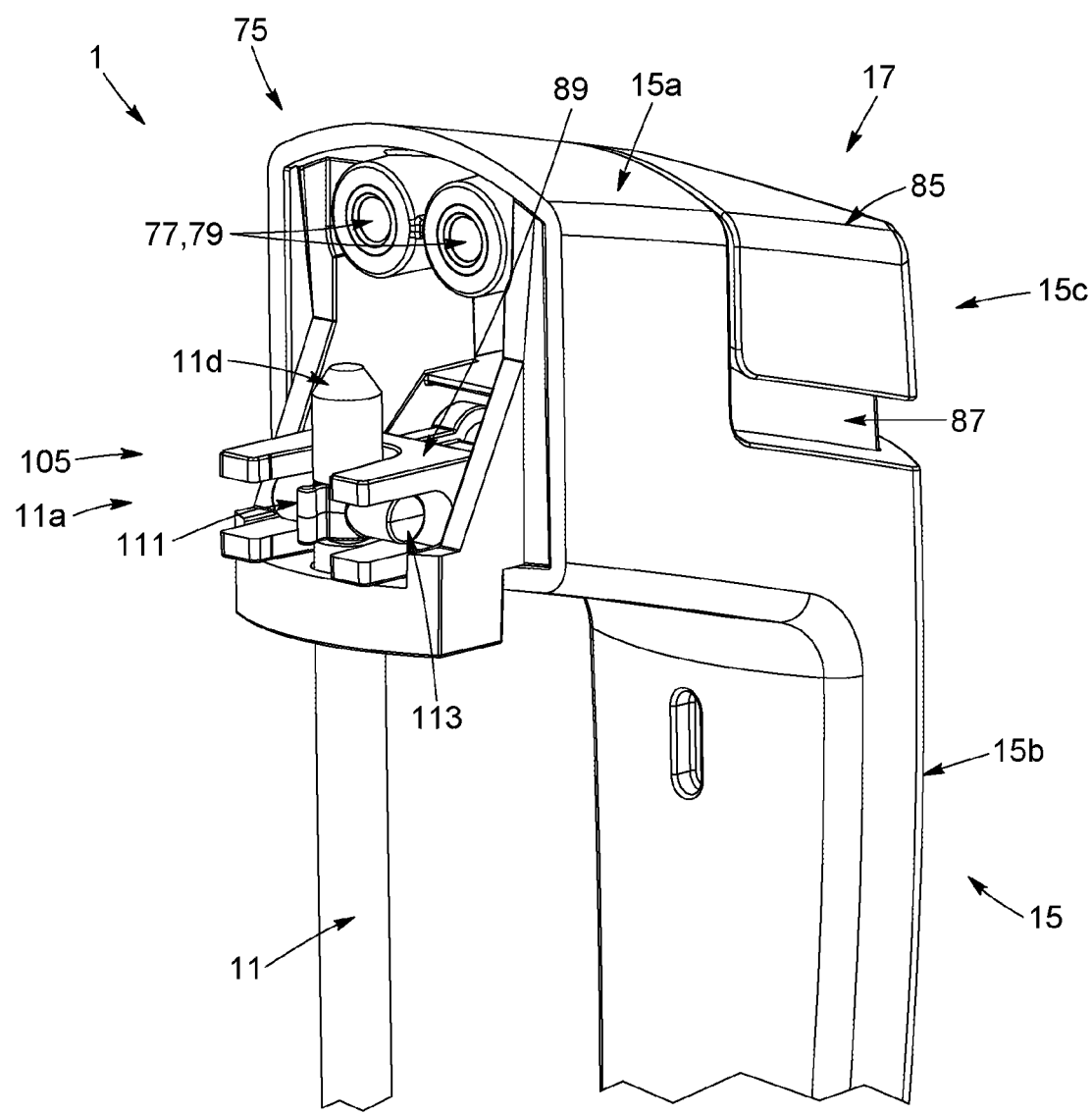
FIG. 17 is an enlarged partial view of an upper portion of what is shown in FIG. 5, to better illustrate a possible cooperation of the handle assembly and associated internal transmission mechanism with a top end of the activation rod according to a possible embodiment of the present invention.
Figure 18:
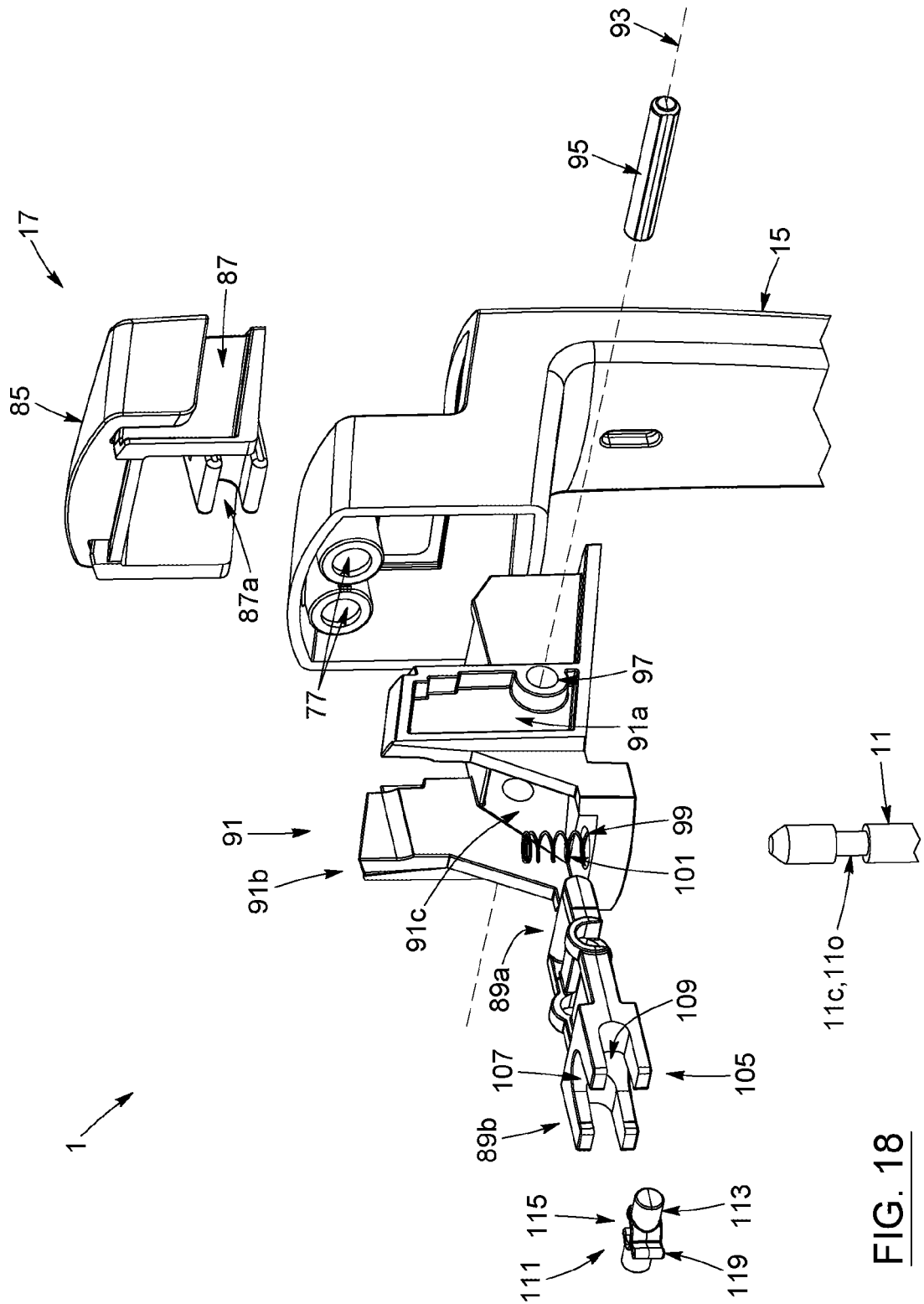
FIG. 18 is an exploded view of what is shown in FIG. 17 to better illustrate different possible components intervening within the handle assembly according to a possible embodiment of the present invention.
Figure 19:
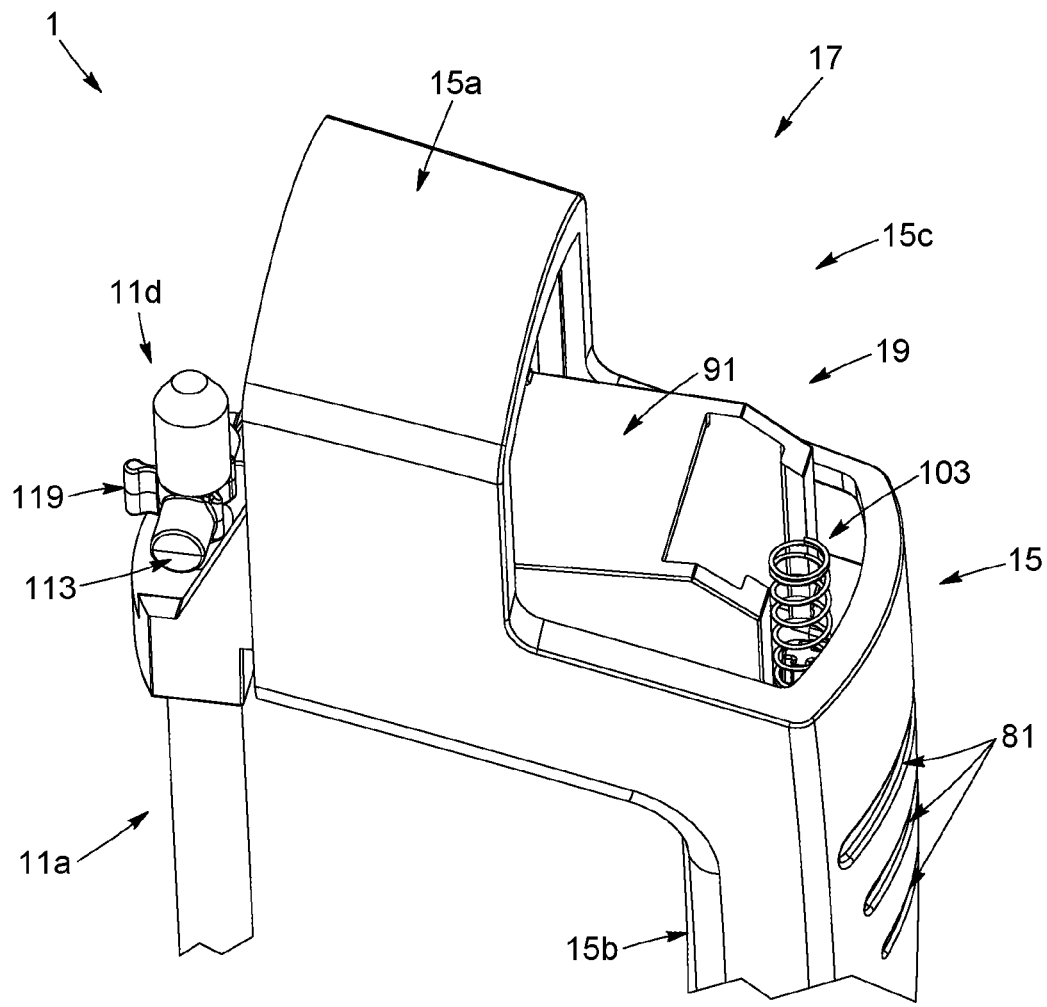
FIG. 19 is a top perspective view of a portion of what is shown in FIG. 17, the activation button and corresponding movable component having been removed so as to better illustrate other internal aspects of the handle assembly.
Figure 21:
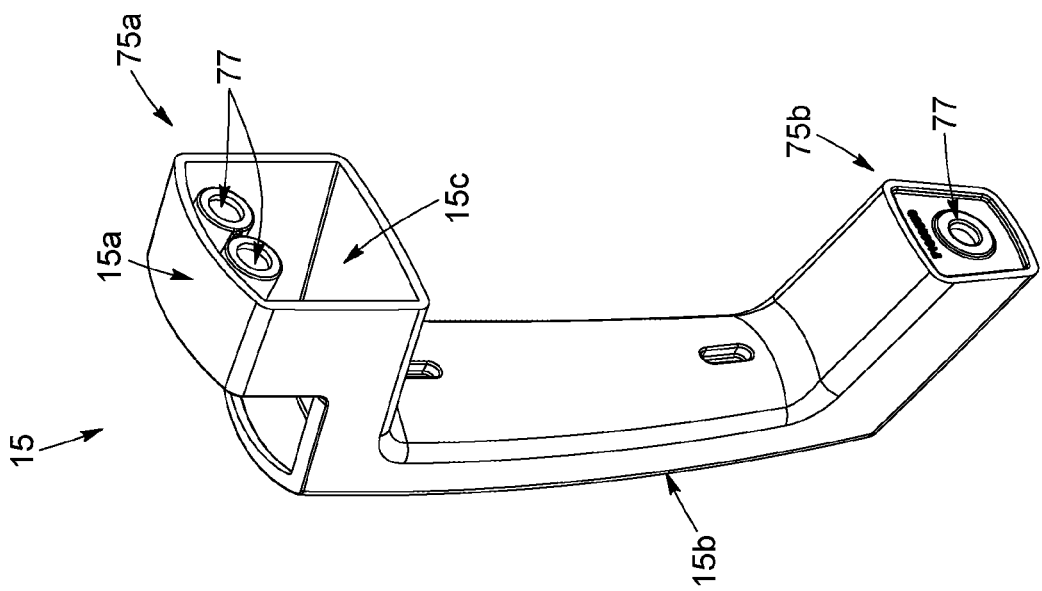
FIG. 21 is a rear perspective view of what is shown in FIG. 20.
Figure 20:
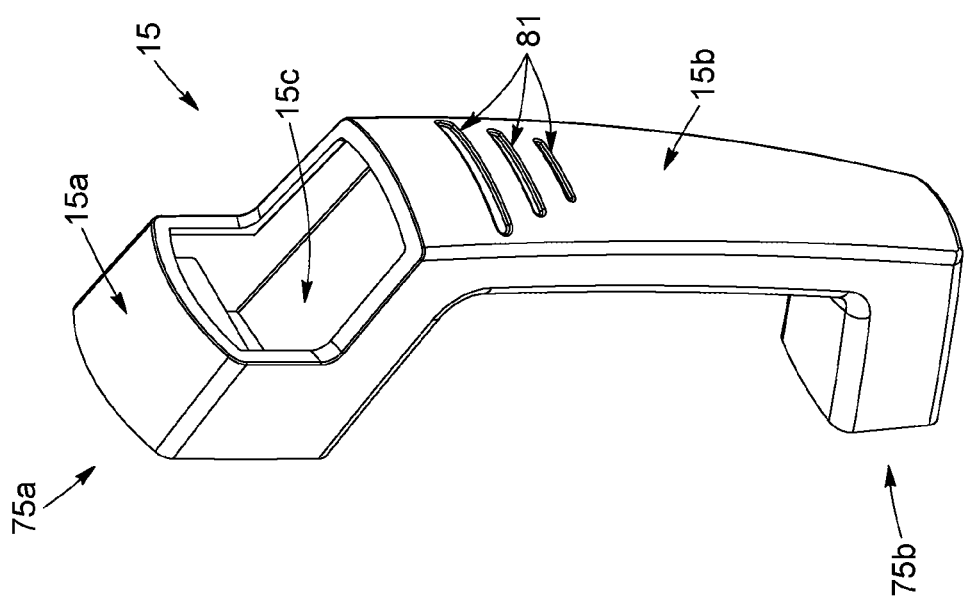
FIG. 20 is a front perspective view of the gripping handle shown in FIG. 5.
Figure 22:
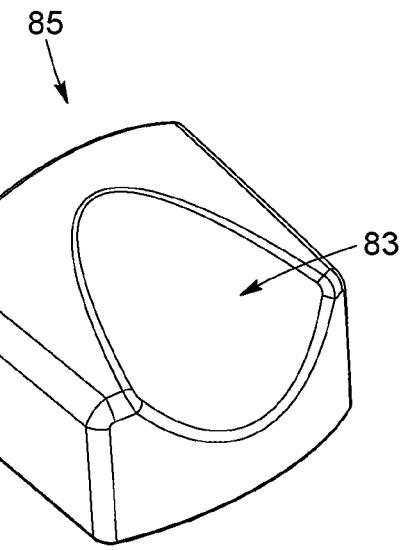
FIG. 22 is a top perspective view of the activation button of the handle assembly shown in FIG. 18.
Figure 23:
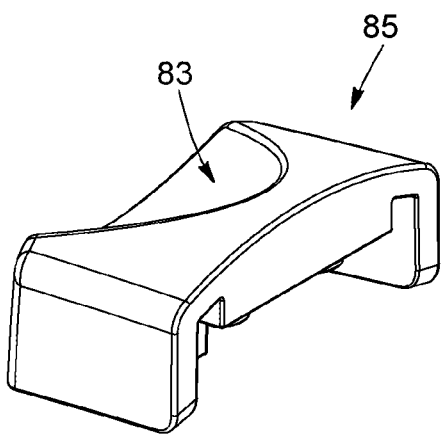
FIG. 23 is another perspective view of what is shown in FIG. 22.
Figure 24:
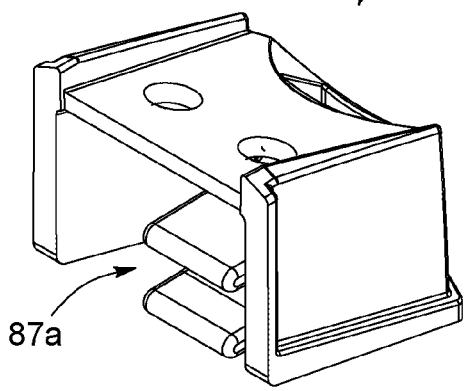
FIG. 24 is a top perspective view of the anchoring component of the handle assembly shown in FIG. 18.
Figure 25:
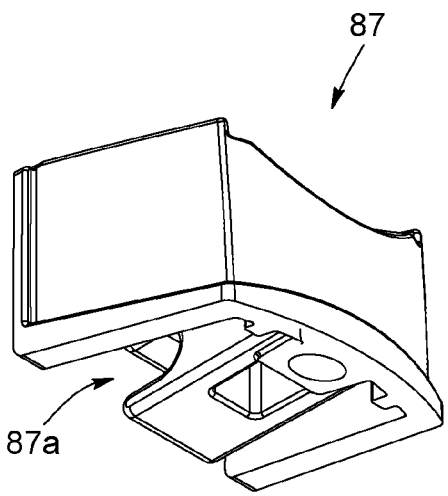
FIG. 25 is a bottom perspective view of what is shown in the FIG. 24.
Figure 26:
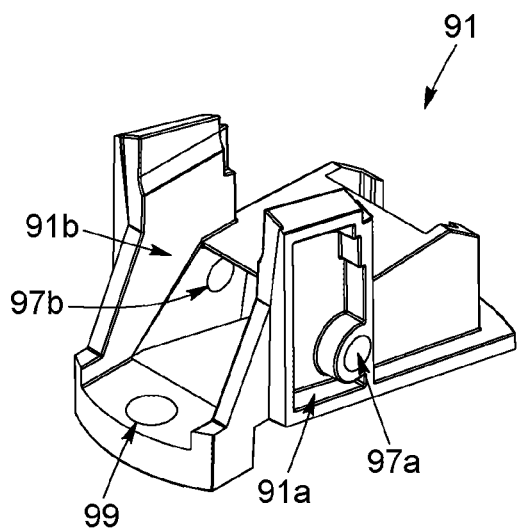
FIG. 26 is a top perspective view of the movable component of the activation button of the handle assembly shown in FIG. 18.
Figure 27:
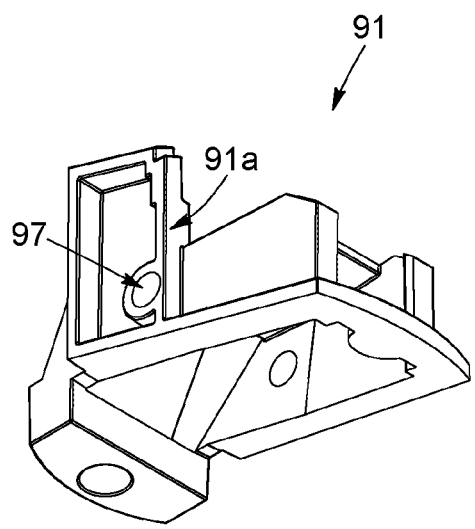
FIG. 27 is a bottom perspective view of what is shown in FIG. 26.
Figure 28:
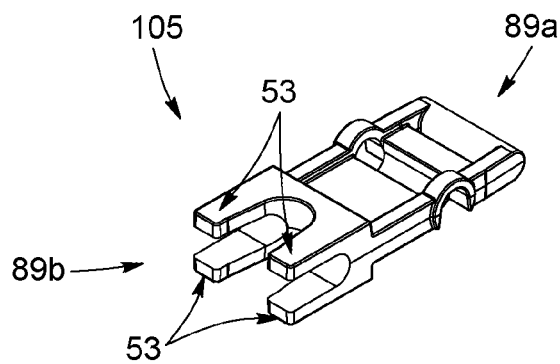
FIG. 28 is a top perspective view of the lever component of the handle assembly shown in FIG. 18.
Figure 29:
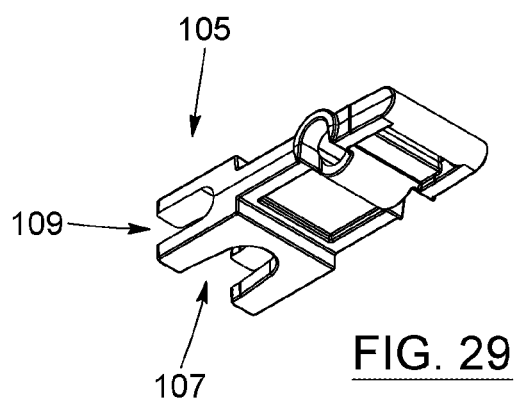
FIG. 29 is a bottom perspective view of what is shown in FIG. 28.
Figure 30:
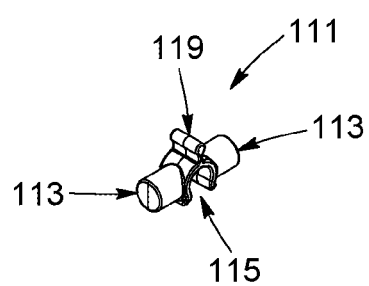
FIG. 30 is a perspective view of the securing component being shown in FIG. 18.
Figure 31:
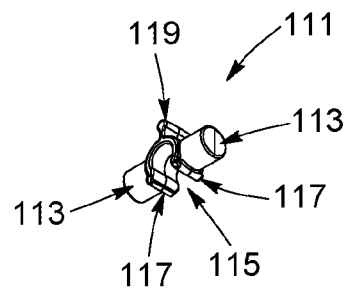
FIG. 31 is another perspective view of what is shown in FIG. 30.

In the following description, the same numerical references refer to similar elements. Furthermore, for sake of simplicity and clarity, namely so as to not unduly burden the figures with several reference numbers, only some figures have been provided with reference numbers, and components and features of the present invention illustrated in other figures can be easily inferred therefrom. The embodiments, geometrical configurations, materials mentioned and/or dimensions shown in the figures are preferred, for exemplification purposes only.

Moreover, although the present invention was primarily designed for use with drawers, in the context of cabinet structures and/or the like, such as a vertical drawer, for example, it may be used with other objects and/or in other types of applications, as apparent to a person skilled in the art. For this reason, expressions such as "drawer", "cabinet", "structure", "vertical", etc., used herein should not be taken so as to limit the scope of the present invention and include all other kinds of objects and/or applications with which the present invention could be used and may be useful. For example, the present handle system could also be used with and/or for various other types of drawers (i.e. not necessarily being "vertical" drawers, per se, and/or of the type that need to necessarily be pulled "in-and out", for instance, given that the present handle system could also be used for drawers that are pivotably rotatable between opened and closed configurations, for example), as can be easily understood by a person skilled in the art.

Moreover, in the context of the present invention, the expressions "handle system", "system", "product", "device", "assembly", "apparatus", "unit", "equipment", "method" and "kit", as well as any other equivalent expression(s) and/or compound word(s) thereof known in the art will be used interchangeably, as apparent to a person skilled in the art. This applies also for any other mutually equivalent expressions, such as, for example: a) "operatively", "effectively", "equivalently", "practically", "directly", "indirectly", "interconnectedly", "remotely", etc.; b) "blocking", "locking", "securing", "closing" "retaining", "stopping", etc. (as well as associated qualifiers, such as "blocked", "locked", "secured", "closed" and/or associated antonyms); c) "moving", "displacing", "pulling", "translating", "rotating", "pivoting", etc. (in that the present drawer, associated handle system and corresponding components thereof can move in various suitable ways other than the ones described and/or exemplified in the present patent specification); d) "hole", "orifice", "through-hole", "bore", "cavity", "recess", "notch", "groove", "slot", "indent", etc.; e) "axis", "pivot", "hinge", etc.; as well as for any other mutually equivalent expressions, pertaining to the aforementioned expressions and/or to any other structural and/or functional aspects of the present invention, as also apparent to a person skilled in the art. Also, in the context of the present description, expressions such as "can", "may", "might", "will", "could", "should", "would", etc., may also be used interchangeably, whenever appropriate, as also apparent to a person skilled in the art.

Furthermore, in the context of the present description, it will be considered that all elongated objects will have an implicit "longitudinal axis" or "centerline", such as the longitudinal axis of shaft for example, or the centerline of a coiled spring, for example, and that expressions such as "connected" and "connectable", or "mounted" and "mountable", may be interchangeable, in that the present invention also relates to a kit with corresponding components for assembling a resulting fully-assembled and fully-operational handle system.

Moreover, components of the present system(s) and/or steps of the method(s) described herein could be modified, simplified, altered, omitted and/or interchanged, without departing from the scope of the present invention, depending on the particular application(s) which the present invention is intended for, and the desired end result(s), as briefly exemplified herein and as also apparent to a person skilled in the art.

In addition, although the preferred embodiments of the present invention as illustrated in the accompanying drawings comprise various components, and although the preferred embodiments of the present handle system and corresponding portion(s)/part(s)/component(s) as shown consist of certain geometrical configurations, as explained and illustrated herein, not all of these components and geometries are essential to the invention and thus should not be taken in their restrictive sense, i.e. should not be taken so as to limit the scope of the present invention. It is to be understood, as also apparent to a person skilled in the art, that other suitable components and cooperation there in between, as well as other suitable geometrical configurations may be used for the present handle system and corresponding portion(s)/part(s)/component(s) according to the present invention, as will be briefly explained herein and as can be easily inferred here from by a person skilled in the art, without departing from the scope of the present invention.

LIST OF NUMERICAL REFERENCES FOR SOME OF THE CORRESPONDING POSSIBLE COMPONENTS ILLUSTRATED IN THE ACCOMPANYING DRAWINGS 1. handle system
3. drawer (ex. vertical drawer and/or any other suitable drawer)
3a. outer side (of drawer)
3b. inner side (of drawer)
3c. bottom portion (of drawer)
5. cabinet structure
5a. internal portion (of cabinet structure)
5b. bottom rim (of cabinet structure)
5c. opening (of cabinet structure)
7. blocking assembly
9. blocking component (of blocking assembly)
9a. bottom portion (of blocking component)
9b. internal portion (of blocking component)
9c. slanted portion (of blocking component)
9d. abutment surface (of blocking component)
9e. skidding portion (of blocking component)
9f. skidding track (of blocking component)
11. activation rod
11a. top end (of activation rod)
11b. bottom end (of activation rod)
11c. peripheral notch (of activation rod)

11*d*. distal tip (of activation rod)
110. circumferential notch (of activation rod)
13. handle assembly
15. gripping handle (of handle assembly)
15*a*. bridging portion (of gripping handle)
15*b*. body portion (of gripping handle)
15*c*. cavity portion (of gripping handle)
17. activation button (of handle assembly)
19. internal transmission mechanism (of handle assembly)
21. mounting component
23. pivot axis (of mounting component)
25. pivot pin (of mounting component)
25*c*. peripheral notch (of pivot pin of mounting component)
25*o*. circumferential notch (of pivot pin of mounting component)
27. bore (of mounting component)
27*a*. first hole (of bore of mounting component)
27*b*. second hole (of bore of mounting component)
29. bore (of blocking component)
29*a*. first hole (of bore of blocking component)
29*b*. second hole (of bore of blocking component)
31. retaining component (of blocking component—for pivot pin)
33. tab (of retaining component)
35. protrusion (of tab)
37. biasing device (for biasing blocking component)
39. blocking-biasing spring
39*a*. first extremity (of blocking-biasing spring)
39*b*. second extremity (of blocking-biasing spring)
41. first receiving component (of mounting component—for spring)
43. second receiving component (of mounting component—for spring)
45. flange (of mounting component)
47. recess (of mounting component)
49. connecting portion (of blocking component)
51. groove (of connecting portion—blocking component—for activation rod)
53. prong(s)
55. erect flange (of blocking component)
57. attachment component (of blocking assembly)
59. lifting wing (of attachment component)
61. sliding wing (of attachment component)
61*a*. sliding surface (of sling wing)
63. slot (ex. U-shaped slot of attachment component)
65. converging entry portion (and/or "side panel" of attachment component)
67. housing (of mounting component)
69. upper groove (of housing)
71. rim (ex. shouldering rim of housing)
73. body recess (of mounting component)
75. mounting portion (of gripping handle)
75*a*. top mounting portion (of gripping handle)
75*b*. bottom mounting portion (of gripping handle)
77. orifice (of mounting portion of gripping handle)
79. fastener (for mounting portion of gripping handle)
81. ridge (of gripping handle)
83. recessed portion (of activation button of handle assembly)
85. activation button cap (of activation button of handle assembly)
87. movable component (of activation button of handle assembly)
87*a*. receiving portion (of movable component of activation button)
89. lever component (of internal transmission mechanism of handle)
89*a*. first extremity (of lever component)
89*b*. second extremity (of lever component)
91. anchoring component (of internal transmission mechanism of handle)
91*a*. first supporting flange (of anchoring component)
91*b*. second supporting flange (of anchoring component)
91*c*. passage of supporting flange (of anchoring component)
93. pivot axis (of handle assembly)
95. pivot pin (of handle assembly)
97. bore (of anchoring component)
97*a*. first hole (of bore of anchoring component)
97*b*. second hole (of bore of anchoring component)
99. cavity (of anchoring component—for spring)
101. transmission-biasing spring
103. button-biasing spring
105. connecting portion (of second extremity of lever component)
107. groove (of connecting portion—lever component—for activation rod)
109. transversal groove (of connecting portion—lever component)
111. securing component (for top end of activation rod)
113. anchoring wing (of securing component)
115. slot (ex. U-shaped slot of securing component)
117. converging entry portion (and/or "side panel" of securing component)
119. manipulating portion (of securing component)

Broadly described, and as better exemplified in the accompanying drawings, the present invention relates to a handle system (1) with integrating blocking assembly, capable of easily, conveniently and securely maintaining a drawer, such as a vertical drawer, for example, automatically in a blocked/locked configuration, while allowing said drawer to be also very easily and conveniently opened by simply pressing on a corresponding activation button of the handle assembly, thanks to the innovative nature of the different components and features of the handle system.

The present handle (1) may come in the form of a handle system (1) including one and/or several of the following possible components and features (and/or different possible combination(s) and/or permutation(s) thereof):

i) A handle system (1) for use in combination with a vertical drawer (3) configured for being pulled in and out of a corresponding cabinet structure (5), the handle system (1) comprising:

a blocking assembly (7) operatively mountable onto a bottom portion (3*c*) of the vertical drawer (3), and being operable between a first configuration known as a blocking configuration where a blocking component (9) of the blocking assembly (7) abuts against an internal portion (5*a*) of the cabinet structure (5) thus preventing the vertical drawer (3) from being pulled out from the cabinet structure (5), and a second configuration known as a releasing configuration where the blocking component (9) is drawn away from said internal portion (5*a*) of the cabinet structure (5) thus allowing the vertical drawer (3) to be pulled out from the cabinet structure (5); an activation rod (11) being positioned, shaped and sized so as to be mountable about an inner side (3*b*) of the vertical drawer (3), the activation rod (11) having opposite top and bottom ends (11*a*,11*b*), the bottom end (11*b*) of the activation rod (11) being positioned, shaped and sized so as to operatively cooperate with the blocking assembly (7) in order to selectively operate the blocking component (9) between the blocking and releasing configurations; and a handle assembly (13) being positioned, shaped and sized so as to be operatively mountable about an outer side (3a) of the vertical drawer (3), the handle assembly (13) including a gripping handle (15), the gripping handle (15) being provided with an outer activation button (17) and a corresponding internal transmission mechanism (19) being operatively linked to the top end (11a) of the activation rod (11) for selectively urging said activation rod (11) between lowered and raised configurations, and in turn operating the blocking assembly (7) between the blocked and releasing configurations respectively, via a corresponding pressing action of the activation button (17) (ex. by a user of the handle system (1)).

ii) A handle system (1) according to any one of the preceding combination(s), wherein the blocking assembly (7) includes a mounting component (21) for operatively mounting the blocking assembly (7) onto the bottom portion (3c) of the vertical drawer (3).

iii) A handle system (1) according to any one of the preceding combination(s), wherein the blocking component (9) of the blocking assembly (7) is operatively mountable about the mounting component (21) of said blocking assembly (7).

iv) A handle system (1) according to any one of the preceding combination(s), wherein the blocking component (9) of the blocking assembly (7) is pivotably mountable about a corresponding pivot axis (23) of the mounting component (21).

v) A handle system (1) according to any one of the preceding combination(s), wherein the pivot axis (23) is provided by a corresponding pivot pin (25) of the blocking assembly (7).

vi) A handle system (1) according to any one of the preceding combination(s), wherein the pivot pin (25) is inserted into corresponding bores (27,29) of the mounting and blocking components (21,9) respectively of the blocking assembly (7).

vii) A handle system (1) according to any one of the preceding combination(s), wherein the bore (29) and associated holes (29a,29b) of the blocking component (9) are positioned internally within the bore (27) and associated holes (27a,27b) of the mounting component (21) of the blocking assembly (7).

viii) A handle system (1) according to any one of the preceding combination(s), wherein the pivot pin (25) is provided with a peripheral notch (25c) for interacting with a corresponding retaining component (31) provided about at least one of the mounting and blocking components (21,9).

ix) A handle system (1) according to any one of the preceding combination(s), wherein the retaining component (31) is provided about the blocking component (9).

x) A handle system (1) according to any one of the preceding combination(s), wherein the retaining component (31) is provided about a bottom portion (9a) of the blocking component (9).

xi) A handle system (1) according to any one of the preceding combination(s), wherein the retaining component (31) includes a substantially resilient tab (33) being positioned, shaped and sized, so as to be biased against the peripheral notch (25c), for maintaining the pivot pin (25) in place when inserted into the corresponding bores (27,29) of the mounting and blocking components (21,9) of the blocking assembly (7).

xii) A handle system (1) according to any one of the preceding combination(s), wherein the substantially resilient tab (33) includes a protrusion (35) for selectively drawing the substantially resilient tab (33) away from the peripheral notch (25c) via a pulling action on the protrusion (35).

xiii) A handle system (1) according to any one of the preceding combination(s), wherein the peripheral notch (25c) is disposed about a centralized portion of the pivot pin (25).

xiv) A handle system (1) according to any one of the preceding combination(s), wherein the peripheral notch (25c) of the pivot pin (25c) is a circumferential notch (25o).

xv) A handle system (1) according to any one of the preceding combination(s), wherein the blocking assembly (7) includes a biasing device (37) for biasing the blocking assembly (7) into the blocking configuration by default (ex. the biasing device (37) could come in various shapes and forms—for example, the nature, shape, disposition and/or even the very own weight of the blocking component (9) could act and/or be used as an "integrated" biasing device (37)—optionally also, the system (1) could be provided with another and/or "separate" biasing device (37), such as an additional component of a given nature, shape, disposition and/or weight, to bias the blocking component (9) accordingly, and/or the biasing device (37) could also simply consist of some sort of "resilient" device, such a spring, for example).

xvi) A handle system (1) according to any one of the preceding combination(s), wherein the blocking assembly (7) is a spring-loaded (ex. spring-biased) blocking assembly (7).

xvii) A handle system (1) according to any one of the preceding combination(s), wherein the biasing device (37) includes a blocking-biasing spring (39) having a first extremity (39a) operatively provided about the mounting component (21) and a second extremity (39b) operatively provided about the blocking component (9), for urging the mounting and blocking components (21,9) away from each other, and in turn, operating the blocking assembly (7) into the blocking configuration by default.

xviii) A handle system (1) according to any one of the preceding combination(s), wherein the blocking assembly (7) comprises a first receiving component (41) provided about the mounting component (21) for receiving the first extremity (39a) of the blocking-biasing spring (39).

xix) A handle system (1) according to any one of the preceding combination(s), wherein the first receiving component (41) is provided about a flange (45) of the mounting component (21).

xx) A handle system (1) according to any one of the preceding combination(s), wherein the flange (45) is defined about corresponding recess (47) of said mounting component (21).

xxi) A handle system (1) according to any one of the preceding combination(s), wherein the blocking assembly (7) comprises a second receiving component (43) provided about the blocking component (9) for receiving the second extremity (39b) of the blocking-biasing spring (39). xxii) A handle system (1) according to any one of the preceding combination(s), wherein second receiving component (43) is provided about an internal portion (9b) of the blocking component (9).

xxiii) A handle system (1) according to any one of the preceding combination(s), wherein the blocking-biasing spring (39) is a coaxial spring.

xxiv) A handle system (1) according to any one of the preceding combination(s), wherein the blocking component (9) includes a slanted portion (9c), said slanted portion (9c) having an abutment surface (9d) being positioned, shaped and sized for abutting against the internal portion (5a) of the cabinet structure (5), thus preventing the vertical drawer (3) from being pulled out from the cabinet structure (5), when the blocking assembly (7) is operated in the blocking configuration.

xxv) A handle system (1) according to any one of the preceding combination(s), wherein the blocking component (9) includes a skidding portion (9e) (ex. a skidding track, etc.) for allowing the blocking component (9) to skid over a bottom rim (5b) of an opening (5c) of the cabinet structure (5) associated with the vertical drawer (3), when the blocking assembly (7) is in a blocking configuration and the vertical drawer (3) is pushed back into the cabinet structure (5).

xxvi) A handle system (1) according to any one of the preceding combination(s), wherein the skidding portion (9e) includes a skidding track (9f).

xxvii) A handle system (1) according to any one of the preceding combination(s), wherein the skidding track (9f) is disposed longitudinally along a centralized portion of the blocking component (9).

xxviii) A handle system (1) according to any one of the preceding combination(s), wherein the blocking component (9) includes a connecting portion (49) for operatively connecting the blocking assembly (7) onto the bottom end (11b) of the activation rod (11).

xxix) A handle system (1) according to any one of the preceding combination(s), wherein the connecting portion (49) is raised (ex. extends upwardly, etc.) with respect to a main body of the blocking component (9).

xxx) A handle system (1) according to any one of the preceding combination(s), wherein the connecting portion of the blocking component (9) includes a groove (51) for receiving (ex. engaging, interlocking with, etc.) a corresponding attachment notch (11c) provided about the bottom end (11b) of the activation rod (11).

xxxi) A handle system (1) according to any one of the preceding combination(s), wherein the connecting portion (49) includes a pair of protruding prongs (53) that define the groove (51). xxxii) A handle system (1) according to any one of the preceding combination(s), wherein the groove (51) is operatively provided about an erect flange (55) extending upwardly from the main body of the blocking component (9).

xxxiii) A handle system (1) according to any one of the preceding combination(s), wherein the erect flange (55) has a length dimensioned so that a distal tip (11d) of the bottom end (11b) of the activation rod (11) is upwardly cleared away from in front of the blocking component (9) when the blocking assembly (7) is operated in the blocking configuration.

xxxiv) A handle system (1) according to any one of the preceding combination(s), wherein blocking assembly (7) includes an attachment component (57) operatively connectable to the bottom end (11b) of the activation rod (11) and for cooperating with the connection portion (49) of the blocking component (9).

xxxv) A handle system (1) according to any one of the preceding combination(s), wherein the attachment component (57) is removably mountable about a peripheral surface of the bottom end (11b) of the activation rod (11), and is positioned, shaped and sized to cooperate with the connection portion (49) of the blocking component (9) so that a movement of the activation rod (11) in turn results into a corresponding and associated movement of the connection portion of the blocking component (9).

xxxvi) A handle system (1) according to any one of the preceding combination(s), wherein the attachment component (57) is removably mountable about a peripheral notch (11c) of the bottom end (11b) of the activation rod (11).

xxxvii) A handle system (1) according to any one of the preceding combination(s), wherein the peripheral notch (11c) of the bottom end (11b) of the activation rod (11) is a circumferential notch (110).

xxxviii) A handle system (1) according to any one of the preceding combination(s), wherein the attachment component (57) includes at least one lifting wing (59) being positioned, shaped and sized for placing under the connection portion (49) of the blocking component (9) and for lifting said connection portion (49) and associated blocking component (9) when the activation rod (11) is raised via the handle assembly (13) during an operation of the blocking assembly (7) into the releasing configuration.

xxxix) A handle system (1) according to any one of the preceding combination(s), wherein the at least one lifting wing (59) includes a pair of lifting wings (59) being provided on either side of the attachment component (57).

xl) A handle system (1) according to any one of the preceding combination(s), wherein the attachment component (57) includes at least one sliding wing (61) being positioned, shaped and sized for sliding against the inner side (3b) of the vertical drawer (3) when the activation rod (11) is displaced during operation of the blocking assembly (7) between the blocking and releasing configurations.

xli) A handle system (1) according to any one of the preceding combination(s), wherein the at least one sliding wing (61) includes a sliding surface (61a) being positioned, shaped and sized for sliding against the inner side (5b) of the vertical drawer (3) when the activation rod (11) is displaced during operation of the blocking assembly (7) between the blocking and releasing configurations.

xlii) A handle system (1) according to any one of the preceding combination(s), wherein the sliding surface (61a) of the at least one sliding wing (61) is substantially rectangular.

xliii) A handle system (1) according to any one of the preceding combination(s), wherein the at least one sliding wing (61) includes a pair of sliding wings (61) being provided on either side of the attachment component (57).

xliv) A handle system (1) according to any one of the preceding combination(s), wherein the attachment component (57) is made of a substantially resilient material so that the attachment is selectively mountable onto the activation rod (11) in a substantially clipping manner (ex. snap-fit).

xlv) A handle system (1) according to any one of the preceding combination(s), wherein the attachment component (57) includes a U-shaped slot (63) for operatively receiving the activation rod (11) into said slot (63).

xlvi) A handle system (1) according to any one of the preceding combination(s), wherein the U-shaped slot (63) of the attachment component (57) is provided with converging entry portions (65) (ex. side panels, etc.) for facilitating reception and entry of the activation rod (11) into the attachment component (57).

xlvii) A handle system (1) according to any one of the preceding combination(s), wherein the mounting component (21) comprises a housing (67) being positioned, shaped and sized for removably receiving the connection portion (49) of the blocking component (9) therein when the blocking assembly (7) is operated in the releasing configuration.

xlviii) A handle system (1) according to any one of the preceding combination(s), wherein the housing (67) comprises an upper groove (69) for receiving a corresponding portion of the activation rod (11).

xlix) A handle system (1) according to any one of the preceding combination(s), wherein the upper groove (69) is provided with a shouldering rim (71) for guiding movement of the activation rod (11) when operated between lowered and lowered configurations, and vice-versa.

l) A handle system (1) according to any one of the preceding combination(s), wherein the mounting component (21) includes a body recess (73) being positioned, shaped and sized for allowing a body portion of the blocking component (9) to pass therethrough when the blocking assembly (7) is operated into the releasing configuration.

li) A handle system (1) according to any one of the preceding combination(s), wherein the gripping handle (15) of the handle assembly (13) includes at least one mounting portion (75) being securely mountable onto the outer side of the vertical drawer (3).

lii) A handle system (1) according to any one of the preceding combination(s), wherein the at least one mounting portion (75) includes at least one corresponding orifice (77) for receiving a corresponding fastener (79) for securely mounting the gripping handle (15) on the outer side (3a) of the vertical drawer (3).

liii) A handle system (1) according to any one of the preceding combination(s), wherein the at least one mounting portion (75) includes top and bottom mounting portions (75a,75b) being securely mountable onto the outer side (3a) of the vertical drawer (3).

liv) A handle system (1) according to any one of the preceding combination(s), wherein a body portion (15b) of the gripping handle (15) of the handle assembly (13) tapers between opposite top and bottom mounting portions (75a,75b), so that an upper body portion of the gripping handle (15) is wider than a lower body portion of said gripping handle (15).

lv) A handle system (1) according to any one of the preceding combination(s), wherein a body portion (15b) of the gripping handle (15) of the handle assembly (13) is substantially straight between opposite top and bottom mounting portions (75a,75b), so that an upper body portion of the gripping handle (15) has a width being substantially equivalent to that of a lower body portion of said gripping handle (15).

lvi) A handle system (1) according to any one of the preceding combination(s), wherein a body portion (15b) of the gripping handle (15) is provided with at least one gripping ridge (81).

lvii) A handle system (1) according to any one of the preceding combination(s), wherein the at least one gripping ridge (81) includes a plurality of gripping ridges (81), each upper ridge (81) being wider than a subsequent lower ridge (81).

lviii) A handle system (1) according to any one of the preceding combination(s), wherein the activation button (17) of the handle assembly (13) is provided about an outer portion of the gripping handle (15).

lix) A handle system (1) according to any one of the preceding combination(s), wherein the activation button (17) of the handle assembly (13) is provided about a top outer portion of the gripping handle (15).

lx) A handle system (1) according to any one of the preceding combination(s), wherein the activation button (17) of the handle assembly (13) is provided adjacent to a top mounting portion (75a) of the gripping handle (15).

lxi) A handle system (1) according to any one of the preceding combination(s), wherein the activation button (17) of the handle assembly (13) is provided with a recessed portion (83) for receiving a corresponding finger of a user of the handle system (1), and for manually operating the handle system (1) and associated handle and blocking assemblies (13,9) between the blocking configuration and the releasing configurations, via a pressing action of the activation button (17) with said finger.

lxii) A handle system (1) according to any one of the preceding combination(s), wherein the recessed portion (83) extends along a portion of a top side of the activation button (17).

lxiii) A handle system (1) according to any one of the preceding combination(s), wherein the recessed portion (83) extends along a portion of a front side of the activation button (17).

lxiv) A handle system (1) according to any one of the preceding combination(s), wherein the recessed portion (83) extends in a slanted manner, with respect to the activation button (17).

lxv) A handle system (1) according to any one of the preceding combination(s), wherein the recessed portion (83) is provided about a corresponding activation button cap (85) being removably mountable about a movable component (87) of the activation button (17), so that a pressing action onto said activation button cap (85) and associated movement thereof in turn results into a corresponding pressing action onto the movable component (87) the activation button (17) and associated movement thereof, which in turn results into a corresponding activation action onto the internal transmission mechanism (19) of the handle assembly (13).

lxvi) A handle system (1) according to any one of the preceding combination(s), wherein the internal transmission mechanism (19) of the handle assembly (13) includes a lever component (89) having first and second extremities (89a,89b), the first extremity (89a) of the lever component (89) being operatively connectable to the activation button (17) of the gripping handle (15), and the second extremity (89b) of the lever component (89) being operatively connectable to the top end (11a) of the activation rod (11).

lxvii) A handle system (1) according to any one of the preceding combination(s), wherein the lever component (89) is operatively and operatively mountable about a corresponding anchoring component (91) of the handle assembly (13).

lxviii) A handle system (1) according to any one of the preceding combination(s), wherein the lever component (89) of the blocking assembly (7) is pivotably mountable about a corresponding pivot axis (93) of the anchoring component (91).

lxix) A handle system (1) according to any one of the preceding combination(s), wherein the pivot axis (93) is provided by a corresponding pivot pin (95) of the handle assembly (13).

lxx) A handle system (1) according to any one of the preceding combination(s), wherein the pivot pin (25) is inserted into a corresponding bore (97) of the anchoring component (91) of the blocking assembly (7).

lxxi) A handle system (1) according to any one of the preceding combination(s), wherein the bore (97) and associated holes (97a,97b) of the anchoring component (91) of the blocking assembly (7) are provided about a pair of supporting flanges (91,91b) of the anchoring component (91).

lxxii) A handle system (1) according to any one of the preceding combination(s), wherein supporting flanges (91a,91b) of the anchoring component (91) are placeable under a bridging portion (15a) of the gripping handle (15).

lxxiii) A handle system (1) according to any one of the preceding combination(s), wherein the anchoring component (91) includes a corresponding passage (91c) being positioned, shaped and sized for allowing the lever component (89) to extend therethrough, as well as for allowing the lever component (89) to be operated and moved about said passage.

lxxiv) A handle system (1) according to any one of the preceding combination(s), wherein the anchoring component (91) includes cavity (99) for receiving a corresponding extremity of a transmission-biasing spring (101) to be used with the internal transmission mechanism (19).

lxxv) A handle system (1) according to any one of the preceding combination(s), wherein the anchoring component (91) of the internal transmission mechanism (19) is a separate component being removably mountable about a corresponding cavity portion (15c) of the gripping handle (15) of the handle assembly (13).

lxxvi) A handle system (1) according to any one of the preceding combination(s), wherein the first extremity (89a) of the lever component (89) is positioned, shaped and sized for cooperating with a receiving portion (87a) of a movable component (87) of the activation button (17), so that a given movement of the movable component (87) of the activation button (17) (ex. pressing action, etc.) in turn results in a corresponding and associated movement (ex. swinging, etc.) of the lever component (89).

lxxvii) A handle system (1) according to any one of the preceding combination(s), wherein a shape of the first extremity (89a) of the lever component (89) is complementary to a shape of the receiving portion (87a) of the movable component (87) of the activation button (17).

lxxviii) A handle system (1) according to any one of the preceding combination(s), wherein the first extremity (89a) of the lever component (89) is removably engageable (ex. insertable into, interlockable, etc.) with the receiving portion (87a) of the movable component (87) of the activation button (17).

lxxix) A handle system (1) according to any one of the preceding combination(s), wherein the first extremity (89a) of the lever component (89) and the receiving portion (87a) of the movable component (87) of the activation button (17) are made of substantially resilient materials so that engagement between them be done in a substantially clipping manner (ex. snap-fit).

lxxx) A handle system (1) according to any one of the preceding combination(s), wherein the handle assembly (13) includes a button-biasing spring (103) operatively connectable to the movable component (87) of the activation button (17) in order to operatively spring-load said movable component (87) and associated activation button (17) into a raised configuration, by default.

lxxxi) A handle system (1) according to any one of the preceding combination(s), wherein the handle assembly (13) includes a transmission-biasing spring (101) operatively connectable to the second extremity (89b) of the lever component (89) in order to operatively spring-load the lever component (89) of the internal transmission mechanism (19) into a given configuration.

lxxxii) A handle system (1) according to any one of the preceding combination(s), wherein the second extremity (89b) of the lever component (89) includes a connecting portion (105) for operatively connecting said lever component (89) to the top end (11a) of the activation rod (11), and thus, for in turn operatively connecting the handle assembly (13) via its internal transmission mechanism (19) onto the top end (11a) of the activation rod (11).

lxxxiii) A handle system (1) according to any one of the preceding combination(s), wherein the connecting portion (105) of the lever component (89) is provided about a distal end of the second extremity (89b) of the lever component (89).

lxxxiv) A handle system (1) according to any one of the preceding combination(s), wherein the connecting portion (105) of the lever component (89) includes at least one groove (107) for receiving (ex. engaging, interlocking with, etc.) at least one peripheral segment of the top end (11a) of the activation rod (11).

lxxxv) A handle system (1) according to any one of the preceding combination(s), wherein the connecting portion (105) of the lever component (89) includes at least one pair of protruding prongs (53) that define the at least one groove (107).

lxxxvi) A handle system (1) according to any one of the preceding combination(s), wherein the connecting portion (105) of the lever component (89) includes a pair of grooves (105) for receiving a corresponding pair of peripheral segments of the top end (11a) of the activation rod (11).

lxxxvii) A handle system (1) according to any one of the preceding combination(s), wherein the pair of grooves (105) for receiving a corresponding pair of peripheral segments of the top end (11a) of the activation rod (1) are defined by two corresponding pairs of protruding prongs (53) provided about the connecting portion (105) of the lever component (89).

lxxxviii) A handle system (1) according to any one of the preceding combination(s), wherein the two corresponding pairs of protruding prongs (53) of the connecting portion (105) of the lever component (89) define a transversal groove (109) for receiving (ex. engaging, interlocking with, etc.) a securing component (111)

being positioned, shaped and sized for securely maintaining the top end of the activation rod (11) connected to the connection portion of the lever component (89).

lxxxix) A handle system (1) according to any one of the preceding combination(s), wherein the securing component (111) is removably mountable about the transversal groove (109) of the connection portion (105) of the lever component (89) and about a peripheral surface of the top end (11a) of the activation rod (11), the securing component (111) being further positioned, shaped and sized to cooperate with the connection portion (105) of the lever component (89) so that a movement of the connection portion (105) of the lever component (89) of the handle assembly (13), via a corresponding operation of the activation button (17) of the handle assembly (13), in turn results into a corresponding and associated movement of the activation rod (11) of the handle system (1), and in turn results into a corresponding operation of the blocking assembly (7) via its blocking component (9) operatively connectable to the activation rod (11) from a blocking configuration to a releasing configuration.

xc) A handle system (1) according to any one of the preceding combination(s), wherein the securing component (111) is removably mountable about a peripheral notch (11c) of the top end (11a) of the activation rod (11).

xci) A handle system (1) according to any one of the preceding combination(s), wherein the peripheral notch (11c) of the top end (11a) of the activation rod (11) is a circumferential notch (11o).

xcii) A handle system (1) according to any one of the preceding combination(s), wherein the securing component (111) is removably mountable between at least top and bottom prongs (53) of the connection portion (105) of the lever component (89), for maintaining the top end (11a) of the activation rod (11) connected to the connection portion (105) of the lever component (89), and in turn for raising the activation rod (11) via operation of the activation button (17) of the gripping handle (15) acting on its internal transmission mechanism (19).

xciii) A handle system (1) according to any one of the preceding combination(s), wherein the securing component (111) includes at least one anchoring wing (113) being positioned, shaped and sized for placing between at least one pair of upper and lower prongs (53) of the connection portion (105) of the lever component (89) and for anchoring the top end (11a) of the activation rod (11) to said connection portion (105) of the lever component (89) and associated internal transmission mechanism (19) of the handle assembly (13), so that a given movement of the movable component (87) of the activation button (17) (ex. pressing action, etc.) in turn results in a corresponding and associated movement (ex. raising, etc.) of the activation rod (11).

xciv) A handle system (1) according to any one of the preceding combination(s), wherein the securing component (111) includes a pair of anchoring wings (113) being provided on either side of the securing component (111).

xcv) A handle system (1) according to any one of the preceding combination(s), wherein the securing component (111) is made of a substantially resilient material so that the securing component (111) is selectively mountable onto the activation rod (11) in a substantially clipping manner (ex. snap-fit).

xcvi) A handle system (1) according to any one of the preceding combination(s), wherein the securing component (111) includes a U-shaped slot (115) for operatively receiving the activation rod (11) into said slot (115).

xcvii) A handle system (1) according to any one of the preceding combination(s), wherein the U-shaped slot (115) of the securing component (111) is provided with converging entry portions (117) (ex. side panels, etc.) for facilitating reception and entry of the activation rod (11) into the securing component (111).

xcviii) A handle system (1) according to any one of the preceding combination(s), wherein the securing component (111) is provided with a manipulating portion (119) (ex. a handling and/or a pulling portion) for allowing a user to manipulate the securing component (111) with respect to the activation rod (11) (ex. place and push the securing component (111) onto to the activation rod (11), and/or to pull it off from the activation rod (11), etc.).

xcix) A handle system (1) according to any one of the preceding combination(s), wherein the activation rod (11) includes tapered distal tips (11d).

c) A handle system (1) according to any one of the preceding combination(s), wherein the top and bottom ends (11a,11b) of the activation rod (11) are identical to one another, and wherein the activation rod (11) is symmetrical about a mid point of said activation rod (11) (ex. for conveniently enabling either one of the top end (11a) and/or the bottom end (11b) of the activation rod (11), to be used with the blocking assembly (7) and/or the blocking assembly (13), irrespectively of the orientation of the activation rod (11), etc.).

ci) A handle system (1) according to any one of the preceding combination(s), wherein a length of the activation rod (11) is selected based on a positioning of the handle assembly (13) about the vertical drawer (3).

cii) A kit with corresponding components for assembling a handle system (1) according to any one of the preceding combination(s).

ciii) A cabinet structure (5) comprising at least one vertical drawer (3) being provided with a handle system (1) according to any one of the preceding combination(s).

As will now be better appreciated, the present handle system (1) is advantageous in that it offers, namely, but not limited to, the following advantages: a) it provides a way of keeping the drawer (3) "closed" without having to necessarily be "locked", even if the cabinet structure (5) is inclined at an angle and/or subject to vibrations caused by a displacement of a moving "reference frame", such as in the case of a boat, or a service truck, for example, etc.); b) it also provides an "intuitive" way of opening the drawer (3) with one single hand, with the added benefit that the opening mechanism (19) is integrated into the handle (15) of the drawer (3), as exemplified in the accompanying drawings—indeed, and according to the possible embodiment(s) shown, the present system (1) is advantageously designed so as to allow an easy and convenient operation either by a right-hand and/or by a left-hand of a given user; c) it also provides a functional overall mechanism that works irrespectively of the position of the gripping handle (15) on the facade of the drawer (3)—indeed, the gripping handle (15) may be installed either in a lower portion, in an upper portion, or at any other intermediate position, on the entire span of the facade of the drawer (3)—one simply has to use an appropriate activation rod (11) (15), accordingly; and d) the present handle system (1) also make it possible to close the drawer (3) without having to manually activate the mechanism (19)—indeed, the drawer (3) may be closed and maintained in a closed configuration "automatically" due to its inertia when pulled back into the cabinet structure (5) and thanks to the innovative design of the present blocking assembly (7), including associated blocking component (9)—indeed, and as can also be now better appreciated, the present handle system (1) is designed so as to advantageously allow the drawer (3) to be "closed" in and "pulled back into" the cabinet structure (5), with a simply "push" (and without having to operate any corresponding component and/or turn any associated key, etc.), while automatically "reactivating" the blocking component (9) when the drawer (3) arrives to its closed position, so as to advantageously prevent the drawer (3) from being re-opened in an undesirable manner, until a user may eventually "press back down" again onto the activation button (17) of the handle assembly, if and when needed.

In addition to what has been discussed and explained hereinabove, one can also appreciate that before even touching the given gripping handle (15) and/or associated activation button (17), a user of the handle system (1) has a natural and visual indication which will make him/her understand the operating principle of the mechanism. Indeed, the presence of a little gap between the activation button (17) and the rest of the body portion (15b) of the gripping handle (15), as well as the recessed portion (83) or cavity on the top of the upper activation button (17), enables a given user to easily understand that one has to simply "press" on said upper activation button (17) with a finger (ex. a thumb, and/or any another suitable finger), in order to activate the handle system (1) and associated internal mechanism (19).

Optionally also, the present handle system (1) is designed so as to prevent the drawer (3) from being opened without pressing onto the upper activation button (17) of the handle assembly, because of the presence of the blocking assembly (7) and associated blocking component (9) present under the drawer (3), which, according to one possible embodiment, may be provided on the bottom portion (3b) of the drawer (3), as exemplified in the accompanying drawings, although it is worth mentioning that various other suitable locations (ex. directly on the inner side (3b) of the facade of the drawer (3), directly on the cabinet structure (5) itself, etc.), are also contemplated by the present handle system (1). Also when referring to the accompanying drawings, one can also easily understand that when a user presses down onto the upper activation button (17) with a given finger, for example, the internal transmission mechanism (19) of the handle assembly generates a corresponding translational movement upwardly of the activation rod (11), which in turn, has the effect of rising the blocking component (9) of the blocking assembly (7), and thus enabling a release and a possible pulling out of the drawer (3) from the corresponding opening of the associated cabinet structure (5).

As can also be easily understood when referring to the accompanying drawings as well, and according to a possible embodiment, the blocking component (9) is maintained on the mounting component (21) by means of a pivot pin (25), for example. A possible function of the mounting component (21) can thus be to provide the blocking component (9), with a corresponding pivot axis (23), but also, to guide the activation rod (11) during operation/movement. Furthermore, the presence of a biasing spring (39) automatically urges the blocking component (9) towards a lowered position, as exemplified in the accompanying drawings, which corresponds to a blocking configuration of the present handle system (1), by default, once assembled—therefore, one has simply to fix the activation rod (11) and maintain it into place with a corresponding attachment component (57) (as a result, one can also appreciate that the entire assembly process is very quick, easy and reliable). This attachment component (57) positions itself under the upper prongs (53) of the blocking component (9). Consequently, when one raises the activation rod (11) via the activation button (17) and associated internal transmission mechanism (19), the latter will raise the attachment component (57) and, in doing so, will also raise the blocking component (9), thereby enabled an "unblocking" and possible "release/opening" of the drawer (3), etc.

When the drawer (3) is closed once again (for example, pushed back into the cabinet structure (5), etc.), the slanted portion (9c) of the blocking component (9) comes into contact with the bottom of the casing (ex. bottom rim (5b), etc.) of the cabinet structure (5). Thanks to the effect of a sloped angle provided by the slanted portion (9c), the blocking component (9) raises by itself. Given the fact that the attachment component (57) is located under the upper prongs (53) of the blocking component (9), the latter is able to raise itself without generating a corresponding movement of the activation rod (11), as can be easily when referring to the accompanying drawings, and this feature is also very advantageous.

Indeed, closing of the drawer (3) onto the cabinet structure (5) is thus done in a very easy manner, without generating movement within the main internal pieces of the handle assembly (13) and without having to activate the corresponding activation button (17) of the handle assembly (13). When the drawer (3) comes to a completely closed position, the biasing spring (39) mentioned above ensures that the blocking component (9) will come back down to its original lower position, in order to safely and securely "block" the drawer (3), and advantageously maintained it in place, in such a closed configuration, until a user may eventually "press back down" again onto the activation button (17) of the handle assembly, if and when needed.

The present handle system (1) and corresponding parts are preferably made of substantially rigid materials, such as metallic materials, hardened polymers, composite materials, polymeric materials, and/or the like, so as to ensure a proper operation thereof depending on the particular applications for which the handle system (1) is intended and the different parameters (weights, loads, moments, etc.) in cause, as apparent to a person skilled in the art.

Of course, and as can be easily understood by a person skilled in the art, the scope of the claims should not be limited by the possible embodiments set forth in the examples, but should be given the broadest interpretation consistent with the description as a whole.

Furthermore, although preferred embodiments of the present invention have been briefly described herein and illustrated in the accompanying drawings, it is to be understood that the invention is not limited to these embodiments and that various changes and modifications could be made without departing form the scope and spirit of the present invention, as defined in the appended claims and as apparent to a person skilled in the art.

The invention claimed is:

1. A handle system (1) for use in combination with a vertical drawer (3) configured for being pulled in and out of a corresponding cabinet structure (5), the handle system (1) comprising:

a blocking assembly (7) operatively mountable onto a bottom portion (3c) of the vertical drawer (3), and being operable between a first blocking configuration where a blocking component (9) of the blocking assembly (7) abuts against an internal portion (5a) of the cabinet structure (5) thus preventing the vertical drawer (3) from being pulled out from the cabinet structure (5), and a second releasing configuration where the blocking component (9) is drawn away from said internal portion (5a) of the cabinet structure (5) thus allowing the vertical drawer (3) to be pulled out from the cabinet structure (5);

an activation rod (11) being positioned, shaped and sized so as to be mountable about an inner side (3b) of the vertical drawer (3), the activation rod (11) having opposite top and bottom ends (11a, 11b), the bottom end (11b) of the activation rod (11) being positioned, shaped and sized so as to operatively cooperate with the blocking assembly (7) to selectively operate the blocking component (9) between the blocking and releasing configurations; and a handle assembly (13) being positioned, shaped and sized so as to be operatively mountable about an outer side (3a) of the vertical drawer (3), the handle assembly (13) including a gripping handle (15), the gripping handle (15) being provided with an outer activation button (17) and a corresponding internal transmission mechanism (19) operatively linked to the top end (11a) of the activation rod (11) for selectively urging said activation rod (11) between lowered and raised configurations, and in turn operating the blocking assembly (7) between the blocked and releasing configurations respectively, via a corresponding pressing action of the activation button (17).

2. A handle system (1) according to claim 1, wherein the blocking assembly (7) includes a mounting component (21) for operatively mounting the blocking assembly (7) onto the bottom portion (3c) of the vertical drawer (3).

3. A handle system (1) according to claim 2, wherein the blocking component (9) of the blocking assembly (7) is operatively mountable about the mounting component (21) of said blocking assembly (7).

4. A handle system (1) according to claim 2, wherein the blocking component (9) of the blocking assembly (7) is pivotably mountable about a corresponding pivot axis (23) of the mounting component (21).

5. A handle system (1) according to claim 4, wherein the pivot axis (23) is provided by a corresponding pivot pin (25) of the blocking assembly (7).

6. A handle system (1) according to claim 5, wherein the pivot pin (25) is inserted into corresponding bores (27,29) of the mounting and blocking components (21,9) respectively of the blocking assembly (7).

7. A handle system (1) according to claim 6, wherein the bore (29) and associated holes (29a,29b) of the blocking component (9) are positioned internally within the bore (27) and associated holes (27a,27b) of the mounting component (21) of the blocking assembly (7).

8. A handle system (1) according to claim 5, wherein the pivot pin (25) is provided with a peripheral notch (25c) for interacting with a corresponding retaining component (31) provided about at least one of the mounting and blocking components (21,9).

9. A handle system (1) according to claim 8, wherein the retaining component (31) is provided about the blocking component (9).

10. A handle system (1) according to claim 8, wherein the retaining component (31) is provided about a bottom portion (9a) of the blocking component (9).

11. A handle system (1) according to claim 8, wherein the retaining component (31) includes a substantially resilient tab (33) being positioned, shaped and sized, so as to be biased against the peripheral notch (25c), for maintaining the pivot pin (25) in place when inserted into the corresponding bores (27,29) of the mounting and blocking components (21,9) of the blocking assembly (7).

12. A handle system (1) according to claim 11, wherein the substantially resilient tab (33) includes a protrusion (35) for selectively drawing the substantially resilient tab (33) away from the peripheral notch (25c) via a pulling action on the protrusion (35).

13. A handle system (1) according to claim 8, wherein the peripheral notch (25c) is disposed about a centralized portion of the pivot pin (25).

14. A handle system (1) according to claim 8, wherein the peripheral notch (25c) of the pivot pin (25c) is a circumferential notch (250).

15. A handle system (1) according to claim 2, wherein the mounting component (21) comprises a housing (67) being positioned, shaped and sized for removably receiving the connection portion (49) of the blocking component (9) therein when the blocking assembly (7) is operated in the releasing configuration.

16. A handle system (1) according to claim 15, wherein the housing (67) comprises an upper groove (69) for receiving a corresponding portion of the activation rod (11).

17. A handle system (1) according to claim 16, wherein the upper groove (69) is provided with a shouldering rim (71) for guiding movement of the activation rod (11) when operated between lowered and lowered configurations, and vice-versa.

18. A handle system (1) according to claim 2, wherein the mounting component (21) includes a body recess (73) being positioned, shaped and sized for allowing a body portion of the blocking component (9) to pass therethrough when the blocking assembly (7) is operated into the releasing configuration.

19. A handle system (1) according to claim 1, wherein the blocking assembly (7) includes a biasing device (37) for biasing the blocking assembly (7) into the blocking configuration by default.

20. A handle system (1) according to claim 19, wherein the biasing device (37) includes a blocking-biasing spring (39) having a first extremity (39a) operatively provided about the mounting component (21) and a second extremity (39b) operatively provided about the blocking component (9), for urging the mounting and blocking components (21,9) away from each other, and in turn, operating the blocking assembly (7) into the blocking configuration by default.

21. A handle system (1) according to claim 20, wherein the blocking assembly (7) comprises a first receiving component (41) provided about the mounting component (21) for receiving the first extremity (39a) of the blocking-biasing spring (39).

22. A handle system (1) according to claim 21, wherein the first receiving component (41) is provided about a flange (45) of the mounting component (21).

23. A handle system (1) according to claim 22, wherein the flange (45) is defined about corresponding recess (47) of said mounting component (21).

24. A handle system (1) according to claim 21, wherein the blocking assembly (7) comprises a second receiving component (43) provided about the blocking component (9) for receiving the second extremity (39b) of the blocking-biasing spring (39).

25. A handle system (1) according to claim 24, wherein second receiving component (43) is provided about an internal portion (9b) of the blocking component (9).

26. A handle system (1) according to claim 20, wherein the blocking-biasing spring (39) is a coaxial spring.

27. A handle system (1) according to claim 1, wherein the blocking assembly (7) is a spring-loaded blocking assembly (7).

28. A handle system (1) according to claim 1, wherein the blocking component (9) includes a slanted portion (9c), said slanted portion (9c) having an abutment surface (9d) being positioned, shaped and sized for abutting against the internal portion (5a) of the cabinet structure (5), thus preventing the vertical drawer (3) from being pulled out from the cabinet structure (5), when the blocking assembly (7) is operated in the blocking configuration.

29. A handle system (1) according to claim 1, wherein the blocking component (9) includes a skidding portion (9e) for allowing the blocking component (9) to skid over a bottom rim (5b) of an opening (5c) of the cabinet structure (5) associated with the vertical drawer (3), when the blocking assembly (7) is in a blocking configuration and the vertical drawer (3) is pushed back into the cabinet structure (5).

30. A handle system (1) according to claim 29, wherein the skidding portion (9e) includes a skidding track (9f).

31. A handle system (1) according to claim 30, wherein the skidding track (9f) is disposed longitudinally along a centralized portion of the blocking component (9).

32. A handle system (1) according to claim 1, wherein the blocking component (9) includes a connecting portion (49) for operatively connecting the blocking assembly (7) onto the bottom end (11b) of the activation rod (11).

33. A handle system (1) according to claim 32, wherein the connecting portion (49) is raised with respect to a main body of the blocking component (9).

34. A handle system (1) according to claim 32, wherein the connecting portion of the blocking component (9) includes a groove (51) for receiving a corresponding attachment notch (11c) provided about the bottom end (11b) of the activation rod (11).

35. A handle system (1) according to claim 34, wherein the connecting portion (49) includes a pair of protruding prongs (53) that define the groove (51).

36. A handle system (1) according to claim 34, wherein the groove (51) is operatively provided about an erect flange (55) extending upwardly from the main body of the blocking component (9).

37. A handle system (1) according to claim 36, wherein the erect flange (55) has a length dimensioned so that a distal tip (11d) of the bottom end (11b) of the activation rod (11) is upwardly cleared away from in front of the blocking component (9) when the blocking assembly (7) is operated in the blocking configuration.

38. A handle system (1) according to claim 32, wherein blocking assembly (7) includes an attachment component (57) operatively connectable to the bottom end (11b) of the activation rod (11) and for cooperating with the connection portion (49) of the blocking component (9).

39. A handle system (1) according to claim 38, wherein the attachment component (57) is removably mountable about a peripheral surface of the bottom end (11b) of the activation rod (11), and is positioned, shaped and sized to cooperate with the connection portion (49) of the blocking component (9) so that a movement of the activation rod (11) in turn results into a corresponding and associated movement of the connection portion of the blocking component (9).

40. A handle system (1) according to claim 38, wherein the attachment component (57) is removably mountable about a peripheral notch (11c) of the bottom end (11b) of the activation rod (11).

41. A handle system (1) according to claim 40, wherein the peripheral notch (11c) of the bottom end (11b) of the activation rod (11) is a circumferential notch (110).

42. A handle system (1) according to claim 38, wherein the attachment component (57) includes at least one lifting wing (59) being positioned, shaped and sized for placing under the connection portion (49) of the blocking component (9) and for lifting said connection portion (49) and associated blocking component (9) when the activation rod (11) is raised via the handle assembly (13) during an operation of the blocking assembly (7) into the releasing configuration.

43. A handle system (1) according to claim 42, wherein the at least one lifting wing (59) includes a pair of lifting wings (59) being provided on either side of the attachment component (57).

44. A handle system (1) according to claim 38, wherein the attachment component (57) includes at least one sliding wing (61) being positioned, shaped and sized for sliding against the inner side (3b) of the vertical drawer (3) when the activation rod (11) is displaced during operation of the blocking assembly (7) between the blocking and releasing configurations.

45. A handle system (1) according to claim 44, wherein the at least one sliding wing (61) includes a sliding surface (61a) being positioned, shaped and sized for sliding against the inner side (5b) of the vertical drawer (3) when the activation rod (11) is displaced during operation of the blocking assembly (7) between the blocking and releasing configurations.

46. A handle system (1) according to claim 45, wherein the sliding surface (61a) of the at least one sliding wing (61) is substantially rectangular.

47. A handle system (1) according to claim 44, wherein the at least one sliding wing (61) includes a pair of sliding wings (61) being provided on either side of the attachment component (57).

48. A handle system (1) according to claim 38, wherein the attachment component (57) is made of a substantially resilient material so that the attachment is selectively mountable onto the activation rod (11) in a substantially clipping manner.

49. A handle system (1) according to claim 38, wherein the attachment component (57) includes a U-shaped slot (63) for operatively receiving the activation rod (11) into said slot (63).

50. A handle system (1) according to claim 49, wherein the U-shaped slot (63) of the attachment component (57) is provided with converging entry portions (65) for facilitating reception and entry of the activation rod (11) into the attachment component (57).

51. A handle system (1) according to claim 1, wherein the gripping handle (15) of the handle assembly (13) includes at least one mounting portion (75) being securely mountable onto the outer side of the vertical drawer (3).

52. A handle system (1) according to claim 51, wherein the at least one mounting portion (75) includes at least one corresponding orifice (77) for receiving a corresponding fastener (79) for securely mounting the gripping handle (15) on the outer side (3a) of the vertical drawer (3).

53. A handle system (1) according to claim 51, wherein the at least one mounting portion (75) includes top and bottom mounting portions (75a,75b) being securely mountable onto the outer side (3a) of the vertical drawer (3).

54. A handle system (1) according to claim 1, wherein a body portion (15b) of the gripping handle (15) of the handle assembly (13) tapers between opposite top and bottom mounting portions (75a, 75b), so that an upper body portion of the gripping handle (15) is wider than a lower body portion of said gripping handle (15).

55. A handle system (1) according to claim 1, wherein a body portion (15b) of the gripping handle (15) of the handle assembly (13) is substantially straight between opposite top and bottom mounting portions (75a, 75b), so that an upper body portion of the gripping handle (15) has a width being substantially equivalent to that of a lower body portion of said gripping handle (15).

56. A handle system (1) according to claim 1, wherein a body portion (15b) of the gripping handle (15) is provided with at least one gripping ridge (81).

57. A handle system (1) according to claim 56, wherein the at least one gripping ridge (81) includes a plurality of gripping ridges (81), each upper ridge (81) being wider than a subsequent lower ridge (81).

58. A handle system (1) according to claim 1, wherein the activation button (17) of the handle assembly (13) is provided about an outer portion of the gripping handle (15).

59. A handle system (1) according to claim 1, wherein the activation button (17) of the handle assembly (13) is provided about a top outer portion of the gripping handle (15).

60. A handle system (1) according to claim 1, wherein the activation button (17) of the handle assembly (13) is provided adjacent to a top mounting portion (75a) of the gripping handle (15).

61. A handle system (1) according to claim 1, wherein the activation button (17) of the handle assembly (13) is provided with a recessed portion (83) for receiving a corresponding finger of a user of the handle system (1), and for manually operating the handle system (1) and associated handle and blocking assemblies (13,9) between the blocking configuration and the releasing configurations, via a pressing action of the activation button (17) with said finger.

62. A handle system (1) according to claim 61, wherein the recessed portion (83) extends along a portion of a top side of the activation button (17).

63. A handle system (1) according to claim 61, wherein the recessed portion (83) extends along a portion of a front side of the activation button (17).

64. A handle system (1) according to claim 61, wherein the recessed portion (83) extends in a slanted manner, with respect to the activation button (17).

65. A handle system (1) according to claim 61, wherein the recessed portion (83) is provided about a corresponding activation button cap (85) being removably mountable about a movable component (87) of the activation button (17), so that a pressing action onto said activation button cap (85) and associated movement thereof in turn results into a corresponding pressing action onto the movable component (87) the activation button (17) and associated movement thereof, which in turn results into a corresponding activation action onto the internal transmission mechanism (19) of the handle assembly (13).

66. A handle system (1) according to claim 1, wherein the internal transmission mechanism (19) of the handle assembly (13) includes a lever component (89) having first and second extremities (89a,89b), the first extremity (89a) of the lever component (89) being operatively connectable to the activation button (17) of the gripping handle (15), and the second extremity (89b) of the lever component (89) being operatively connectable to the top end (11a) of the activation rod (11).

67. A handle system (1) according to claim 66, wherein the lever component (89) is operatively and operatively mountable about a corresponding anchoring component (91) of the handle assembly (13).

68. A handle system (1) according to claim 67, wherein the lever component (89) of the blocking assembly (7) is pivotably mountable about a corresponding pivot axis (93) of the anchoring component (91).

69. A handle system (1) according to claim 68, wherein the pivot axis (93) is provided by a corresponding pivot pin (95) of the handle assembly (13).

70. A handle system (1) according to claim 69, wherein the pivot pin (25) is inserted into a corresponding bore (97) of the anchoring component (91) of the blocking assembly (7).

71. A handle system (1) according to claim 70, wherein the bore (97) and associated holes (97a,97b) of the anchoring component (91) of the blocking assembly (7) are provided about a pair of supporting flanges (91,91b) of the anchoring component (91).

72. A handle system (1) according to claim 71, wherein supporting flanges (91a,91b) of the anchoring component (91) are placeable under a bridging portion (15a) of the gripping handle (15).

73. A handle system (1) according to claim 67, wherein the anchoring component (91) includes a corresponding passage (91c) being positioned, shaped and sized for allowing the lever component (89) to extend therethrough, as well as for allowing the lever component (89) to be operated and moved about said passage.

74. A handle system (1) according to claim 67, wherein the anchoring component (91) includes cavity (99) for receiving a corresponding extremity of a transmission-biasing spring (101) to be used with the internal transmission mechanism (19).

75. A handle system (1) according to claim 67, wherein the anchoring component (91) of the internal transmission mechanism (19) is a separate component being removably mountable about a corresponding cavity portion (15c) of the gripping handle (15) of the handle assembly (13).

76. A handle system (1) according to claim 66, wherein the first extremity (89a) of the lever component (89) is positioned, shaped and sized for cooperating with a receiving portion (87a) of a movable component (87) of the activation button (17), so that a given movement of the movable component (87) of the activation button (17) in turn results in a corresponding and associated movement of the lever component (89).

77. A handle system (1) according to claim 76, wherein a shape of the first extremity (89a) of the lever component (89) is complementary to a shape of the receiving portion (87a) of the movable component (87) of the activation button (17).

78. A handle system (1) according to claim 76, wherein the first extremity (89a) of the lever component (89) is removably engageable with the receiving portion (87a) of the movable component (87) of the activation button (17).

79. A handle system (1) according to claim 76, wherein the first extremity (89a) of the lever component (89) and the receiving portion (87a) of the movable component (87) of the activation button (17) are made of substantially resilient materials so that engagement between the first extremity (89A) and the lever component (89) be done in a substantially clipping manner.

80. A handle system (1) according to claim 66, wherein the handle assembly (13) includes a transmission-biasing spring (101) operatively connectable to the second extremity (89b) of the lever component (89) in order to operatively spring-load the lever component (89) of the internal transmission mechanism (19) into a given configuration.

81. A handle system (1) according to claim 66, wherein the second extremity (89b) of the lever component (89) includes a connecting portion (105) for operatively connecting said lever component (89) to the top end (11a) of the activation rod (11), and thus, for in turn operatively connecting the handle assembly (13) via the internal transmission mechanism (19) onto the top end (11a) of the activation rod (11).

82. A handle system (1) according to claim 81, wherein the connecting portion (105) of the lever component (89) is provided about a distal end of the second extremity (89b) of the lever component (89).

83. A handle system (1) according to claim 81, wherein the connecting portion (105) of the lever component (89) includes at least one groove (107) for receiving at least one peripheral segment of the top end (11a) of the activation rod (11).

84. A handle system (1) according to claim 81, wherein the connecting portion (105) of the lever component (89) includes at least one pair of protruding prongs (53) that define the at least one groove (107).

85. A handle system (1) according to claim 81, wherein the connecting portion (105) of the lever component (89) includes a pair of grooves (105) for receiving a corresponding pair of peripheral segments of the top end (11a) of the activation rod (11).

86. A handle system (1) according to claim 85, wherein the pair of grooves (105) for receiving a corresponding pair of peripheral segments of the top end (11a) of the activation rod (1) are defined by two corresponding pairs of protruding prongs (53) provided about the connecting portion (105) of the lever component (89).

87. A handle system (1) according to claim 86, wherein the two corresponding pairs of protruding prongs (53) of the connecting portion (105) of the lever component (89) define a transversal groove (109) for receiving a securing component (111) being positioned, shaped and sized for securely maintaining the top end of the activation rod (11) connected to the connection portion of the lever component (89).

88. A handle system (1) according to claim 87, wherein the securing component (111) is removably mountable about the transversal groove (109) of the connection portion (105) of the lever component (89) and about a peripheral surface of the top end (11a) of the activation rod (11), the securing component (111) being further positioned, shaped and sized to cooperate with the connection portion (105) of the lever component (89) so that a movement of the connection portion (105) of the lever component (89) of the handle assembly (13), via a corresponding operation of the activation button (17) of the handle assembly (13), in turn results into a corresponding and associated movement of the activation rod (11) of the handle system (1), and in turn results into a corresponding operation of the blocking assembly (7) via the blocking component (9) operatively connectable to the activation rod (11) from a blocking configuration to a releasing configuration.

89. A handle system (1) according to claim 87, wherein the securing component (111) is removably mountable about a peripheral notch (11c) of the top end (11a) of the activation rod (11).

90. A handle system (1) according to claim 89, wherein the peripheral notch (11c) of the top end (11a) of the activation rod (11) is a circumferential notch (110).

91. A handle system (1) according to claim 87, wherein the securing component (111) is removably mountable between at least top and bottom prongs (53) of the connection portion (105) of the lever component (89), for maintaining the top end (11a) of the activation rod (11) connected to the connection portion (105) of the lever component (89), and in turn for raising the activation rod (11) via operation of the activation button (17) of the gripping handle (15) acting on the internal transmission mechanism (19).

92. A handle system (1) according to claim 87, wherein the securing component (111) includes at least one anchoring wing (113) being positioned, shaped and sized for placing between at least one pair of upper and lower prongs (53) of the connection portion (105) of the lever component (89) and for anchoring the top end (11a) of the activation rod (11) to said connection portion (105) of the lever component (89) and associated internal transmission mechanism (19) of the handle assembly (13), so that a given movement of the movable component (87) of the activation button (17) in turn results in a corresponding and associated movement of the activation rod (11).

93. A handle system (1) according to claim 92, wherein the securing component (111) includes a pair of anchoring wings (113) being provided on either side of the securing component (111).

94. A handle system (1) according to claim 87, wherein the securing component (111) is made of a substantially resilient material so that the securing component (111) is selectively mountable onto the activation rod (11) in a substantially clipping manner (ex. snap-fit).

95. A handle system (1) according to claim 87, wherein the securing component (111) includes a U-shaped slot (115) for operatively receiving the activation rod (11) into said slot (115).

96. A handle system (1) according to claim 95, wherein the U-shaped slot (115) of the securing component (111) is provided with converging entry portions (117) for facilitating reception and entry of the activation rod (11) into the securing component (111).

97. A handle system (1) according to claim 87, wherein the securing component (111) is provided with a manipulating portion (119) for allowing a user to manipulate the securing component (111) with respect to the activation rod (11).

98. A handle system (1) according to claim 1, wherein the handle assembly (13) includes a button-biasing spring (103) operatively connectable to the movable component (87) of the activation button (17) in order to operatively spring-load said movable component (87) and associated activation button (17) into a raised configuration, by default.

99. A handle system (1) according to claim 1, wherein the activation rod (11) includes tapered distal tips (11d).

100. A handle system (1) according to claim 1, wherein the top and bottom ends (11a, 11b) of the activation rod (11) are identical to one another, and wherein the activation rod (11) is symmetrical about a mid point of said activation rod (11).

101. A handle system (1) according to claim 1, wherein a length of the activation rod (11) is selected based on a positioning of the handle assembly (13) about the vertical drawer (3).

102. A kit with corresponding components for assembling a handle system (1) according to claim 1.

103. A cabinet structure (5) comprising at least one vertical drawer (3) being provided with a handle system (1) according to claim 1.

* * * * *